(12) United States Patent
Liu et al.

(10) Patent No.: US 12,518,503 B2
(45) Date of Patent: Jan. 6, 2026

(54) METHOD OF RECTIFYING TEXT IMAGE, TRAINING METHOD, ELECTRONIC DEVICE, AND MEDIUM

(71) Applicant: BEIJING BAIDU NETCOM SCIENCE TECHNOLOGY CO., LTD., Beijing (CN)

(72) Inventors: Xiyan Liu, Beijing (CN); Junjie Cai, Beijing (CN); Kai Zhong, Beijing (CN); Jianzhong Yang, Beijing (CN); Deguo Xia, Beijing (CN); Tongbin Zhang, Beijing (CN); Zhen Lu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 522 days.

(21) Appl. No.: 18/077,026

(22) Filed: Dec. 7, 2022

(65) Prior Publication Data

US 2023/0102804 A1 Mar. 30, 2023

(30) Foreign Application Priority Data

Dec. 8, 2021 (CN) .......................... 202111502497.3

(51) Int. Cl.
*G06V 10/77* (2022.01)
*G06V 10/24* (2022.01)
(Continued)

(52) U.S. Cl.
CPC ........ *G06V 10/243* (2022.01); *G06V 10/7715* (2022.01); *G06V 10/774* (2022.01); *G06V 30/1607* (2022.01); *G06V 30/304* (2022.01)

(58) Field of Classification Search
CPC ... G06T 5/60; G06T 5/80; G06T 2207/20084; G06V 30/40
See application file for complete search history.

(56) References Cited

U.S. PATENT DOCUMENTS

| 2015/0302242 A1* | 10/2015 | Lee ........................ G06F 40/131 |
| | | 382/189 |
| 2020/0192927 A1 | 6/2020 | Chawla et al. |
| 2021/0166013 A1* | 6/2021 | Tensmeyer ............. G06N 3/045 |

FOREIGN PATENT DOCUMENTS

| CN | 110866871 | 3/2020 |
| CN | 111753827 | 10/2020 |

(Continued)

OTHER PUBLICATIONS

Li, M., Fu, B., Zhang, Z., & Qiao, Y. (2021). Character-aware sampling and rectification for scene text recognition. IEEE Transactions on Multimedia, 25, 649-661. (Year: 2021).*

(Continued)

*Primary Examiner* — Stephen R Koziol
*Assistant Examiner* — Ashley Hytrek
(74) *Attorney, Agent, or Firm* — Pillsbury Winthrop Shaw Pittman, LLP

(57) ABSTRACT

A method of rectifying a text image, a training method, an electronic device, and a medium, which relate to a field of an artificial intelligence technology, in particular to fields of computer vision, deep learning technology, intelligent transportation and high-precision maps. An exemplary implementation includes: performing, based on a gating strategy, a plurality of first layer-wise processing on a text image to be rectified, so as to obtain respective feature maps of a plurality of layer levels, wherein each of the feature maps includes a text structural feature related to the text image to be rectified, and the gating strategy is configured to increase an attention to the text structural feature; and performing a plurality of second layer-wise processing on the respective feature maps of the plurality of layer levels, so as to obtain a rectified text image corresponding to the text image to be rectified.

20 Claims, 9 Drawing Sheets

(51) Int. Cl.
*G06V 10/774* (2022.01)
*G06V 30/16* (2022.01)
*G06V 30/304* (2022.01)

(56) References Cited

FOREIGN PATENT DOCUMENTS

| CN | 112016315 | | 12/2020 | |
|---|---|---|---|---|
| CN | 112016315 A | * | 12/2020 | ............. G06N 3/045 |
| CN | 112464945 | | 3/2021 | |
| CN | 113435436 | | 9/2021 | |
| CN | 113435451 | | 9/2021 | |
| CN | 113657399 | | 11/2021 | |

OTHER PUBLICATIONS

L. Wu, Y. Xu, J. Hou, C. L. P. Chen and C.-L. Liu, "A Two-Level Rectification Attention Network for Scene Text Recognition," in IEEE Transactions on Multimedia, vol. 25, pp. 2404-2414, 2023, doi: 10.1109/TMM.2022.3146779. (Year: 2023).*

Shi, B., Wang, X., Lyu, P., Yao, C., & Bai, X. (2016). Robust scene text recognition with automatic rectification. In Proceedings of the IEEE conference on computer vision and pattern recognition (pp. 4168-4176). (Year: 2016).*

Hu, J., Shen, L., & Sun, G. (2018). Squeeze-and-excitation networks. In Proceedings of the IEEE conference on computer vision and pattern recognition (pp. 7132-7141). (Year: 2018).*

Woo, S., Park, J., Lee, J. Y., & Kweon, I. S. (2018). Cbam: Convolutional block attention module. In Proceedings of the European conference on computer vision (ECCV) (pp. 3-19). (Year: 2018).*

Park, J., Woo, S., Lee, J. Y., & Kweon, I. S. (2018). Bam: Bottleneck attention module. arXiv preprint arXiv:1807.06514. (Year: 2018).*

M. Yang et al., "Symmetry-Constrained Rectification Network for Scene Text Recognition," 2019 IEEE/CVF International Conference on Computer Vision (ICCV), Seoul, Korea (South), 2019, pp. 9146-9155, doi: 10.1109/ICCV.2019.00924. (Year: 2019).*

Office Action issued in corresponding Chinese Patent Application No. 202111502497.3, dated Aug. 21, 2023.

Office Action issued in corresponding Chinese Patent Application No. 202111502497.3, dated May 19, 2023.

B. Shi et al., "Robust Scene Text Recognition with Automatic Rectification", 2016 IEEE Conference on Computer Vision and Pattern Recognition, pp. 4168-4176 (2016).

H. Zhang et al., "Gated Context-Aware Network for Definition Generation", Journal of Chinese Information Processing, vol. 34, No. 7, pp. 106-112 (Jul. 2020).

S. Cohen, "Bayesian Analysis in Natural Language Processing 2nd Edition", China Machine Press, pp. 171-176 (2019).

L. He et al., "Research Progress of Text Classification Technology Based on Deep Learning", Computer Engineering, vol. 47, No. 2, pp. 1-11 (Feb. 2021).

D. Bahdanau et al., "Neural Machine Translation by Jointly Learning to Align and Translate", International Conference on Learning Representations 2015, arXiv:1409:0473v7 (accessed Sep. 18, 2023), pp. 1-15 (2015).

Q. Xipeng et al., "Neural Networks and Deep Learning", China Machine Press (2020), 4 page excerpt.

European Search Report issued in corresponding European Patent Application No. 22212042.0, dated Apr. 21, 2023.

B. Shi et al., "Robust Scene Text Recognition with Automatic Rectification", Conference on Computer Vision and Pattern Recognition, pp. 4168-4176 (2016).

* cited by examiner

200

| A plurality of first layer-wise processing is performed on a text image to be rectified based on a gating strategy, so as to obtain respective feature maps of a plurality of layer levels. Each feature map includes a text structural feature related to the text image to be rectified, and the gating strategy is used to increase an attention to the text structural feature | ⟵ S210 |

| A plurality of second layer-wise processing is performed on the respective feature maps of the plurality of layer levels, so as to obtain a rectified text image corresponding to the text image to be rectified | ⟵ S220 |

┌─────────────────────────────────────────────────────────────┐
│ A plurality of first layer-wise processing is performed on a sample text
│ image to be rectified based on a gating strategy, so as to obtain respective
│ sample feature maps of a plurality of layer levels. Each sample feature map ── S410
│ includes a text structural feature related to the sample text image to be
│ rectified, and the gating strategy is used to increase an attention to the text
│ structural feature
└─────────────────────────────────────────────────────────────┘

↓

┌─────────────────────────────────────────────────────────────┐
│ A plurality of second layer-wise processing is performed on the respective
│ sample feature maps of the plurality of layer levels, so as to obtain ── S420
│ respective prediction results of the plurality of layer levels
└─────────────────────────────────────────────────────────────┘

↓

┌─────────────────────────────────────────────────────────────┐
│ A predetermined model is trained using the respective prediction results and
│ real results of the plurality of layer levels, so as to obtain a text image ── S430
│ rectification model
└─────────────────────────────────────────────────────────────┘

┌─────────────────────────────────┐
│                                 │
│    ┌──────────────────────┐     │
│    │ First obtaining module │── 510
│    └──────────────────────┘     │
│                                 │
│    ┌──────────────────────┐     │
│    │   Second obtaining    │── 520
│    │       module          │     │
│    └──────────────────────┘     │
│                                 │
└─────────────────────────────────┘

FIG. 5

METHOD OF RECTIFYING TEXT IMAGE, TRAINING METHOD, ELECTRONIC DEVICE, AND MEDIUM

This application claims priority of Chinese Patent Application No. 202111502497.3 filed on Dec. 8, 2021, which is incorporated herein in its entirety by reference.

TECHNICAL FIELD

The present disclosure relates to a field of an artificial intelligence technology, in particular to fields of computer vision, deep learning technology, intelligent transportation and high-precision maps. Specifically, the present disclosure relates to a method of rectifying a text image, a training method, an electronic device, and a storage medium.

BACKGROUND

A text image may refer to an image containing a text. The text image may have a variety of uses. For example, a computer vision-based street scene object recognition plays an important role in a field of real-time navigation. A text image containing a road sign, a billboard and other text information captured by a vehicle camera may provide a rich semantic information for scene understanding and navigation.

SUMMARY

The present disclosure provides a method of rectifying a text image, a training method, an electronic device, and a medium.

According to an aspect of the present disclosure, a method of rectifying a text image is provided, including: performing, based on a gating strategy, a plurality of first layer-wise processing on a text image to be rectified, so as to obtain respective feature maps of a plurality of layer levels, wherein each of the feature maps includes a text structural feature related to the text image to be rectified, and the gating strategy is configured to increase an attention to the text structural feature; and performing a plurality of second layer-wise processing on the respective feature maps of the plurality of layer levels, so as to obtain a rectified text image corresponding to the text image to be rectified.

According to another aspect of the present disclosure, a method of training a text image rectification model is provided, including: performing, based on a gating strategy, a plurality of first layer-wise processing on a sample text image to be rectified, so as to obtain respective sample feature maps of a plurality of layer levels, wherein each sample feature map includes a text structural feature related to the sample text image to be rectified, and the gating strategy is configured to increase an attention to the text structural feature; and performing a plurality of second layer-wise processing on the respective sample feature maps of the plurality of layer levels, so as to obtain respective prediction results of the plurality of layer levels; and training a predetermined model by using the respective prediction results and real results of the plurality of layer levels, so as to obtain the text image rectification model.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the methods described above.

According to another aspect of the present disclosure, a non-transitory computer-readable storage medium having computer instructions therein is provided, and the computer instructions are configured to cause a computer to implement the methods described above.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, in which:

FIG. 2 schematically shows a flowchart of a method of rectifying a text image according to embodiments of the present disclosure;

FIG. 4 schematically shows a flowchart of a method of training a text image rectification model according to embodiments of the present disclosure;

FIG. 5 schematically shows a block diagram of an apparatus of rectifying a text image according to embodiments of the present disclosure;

DETAILED DESCRIPTION OF EMBODIMENTS

Exemplary embodiments of the present disclosure will be described below with reference to accompanying drawings, which include various details of embodiments of the present disclosure to facilitate understanding and should be considered as merely exemplary. Therefore, those ordinary skilled in the art should realize that various changes and modifications may be made to embodiments described herein without departing from the scope and spirit of the present disclosure. Likewise, for clarity and conciseness, descriptions of well-known functions and structures are omitted in the following description.

A text image may have a distortion, which may affect a quality of the text image and further affect an application of the text image. For example, the distortion may include at least one selected from twisting, bending, or wrinkling. Therefore, a geometric rectification is necessary for a text image to be rectified in a natural scene. Through the geometric rectification of the text image to be rectified, it is possible to obtain a rectified text image with a regular shape (i.e., a normal text image), then reduce a geometric deformation and a background interference, and thus improve an application effect of the text image. For example, applying the rectified text image to a text recognition may improve an accuracy of the text recognition. Applying the text recognition to a navigation service may have a beneficial effect on path planning, intelligent transportation and standardization of driving behavior in the navigation service.

In view of this, embodiments of the present disclosure propose a text image rectification solution. That is, a plurality of first layer-wise processing is performed on a text image to be rectified based on a gating strategy, so as to obtain respective feature maps of a plurality of layer levels. Each feature map includes a text structural feature related to the text image to be rectified, and the gating strategy is used to increase an attention to the text structural feature. A plurality of second layer-wise processing is performed on the respective feature maps of the plurality of layer levels, so as to obtain a rectified text image corresponding to the text image to be rectified.

The above-mentioned gating strategy may be used to increase the attention to the text structural feature, and the text structural feature has a guiding function in a text image rectification. Therefore, by obtaining the respective feature maps of the plurality of layer levels including the text structural feature of the text image to be rectified based on the gating strategy, and processing the respective feature maps of the plurality of layer levels, it is possible to reduce an adverse effect caused by a local disturbance of dense grids and obtain a rectified text image with a high rectification quality, so that the rectification quality may be improved.

Figure 1:
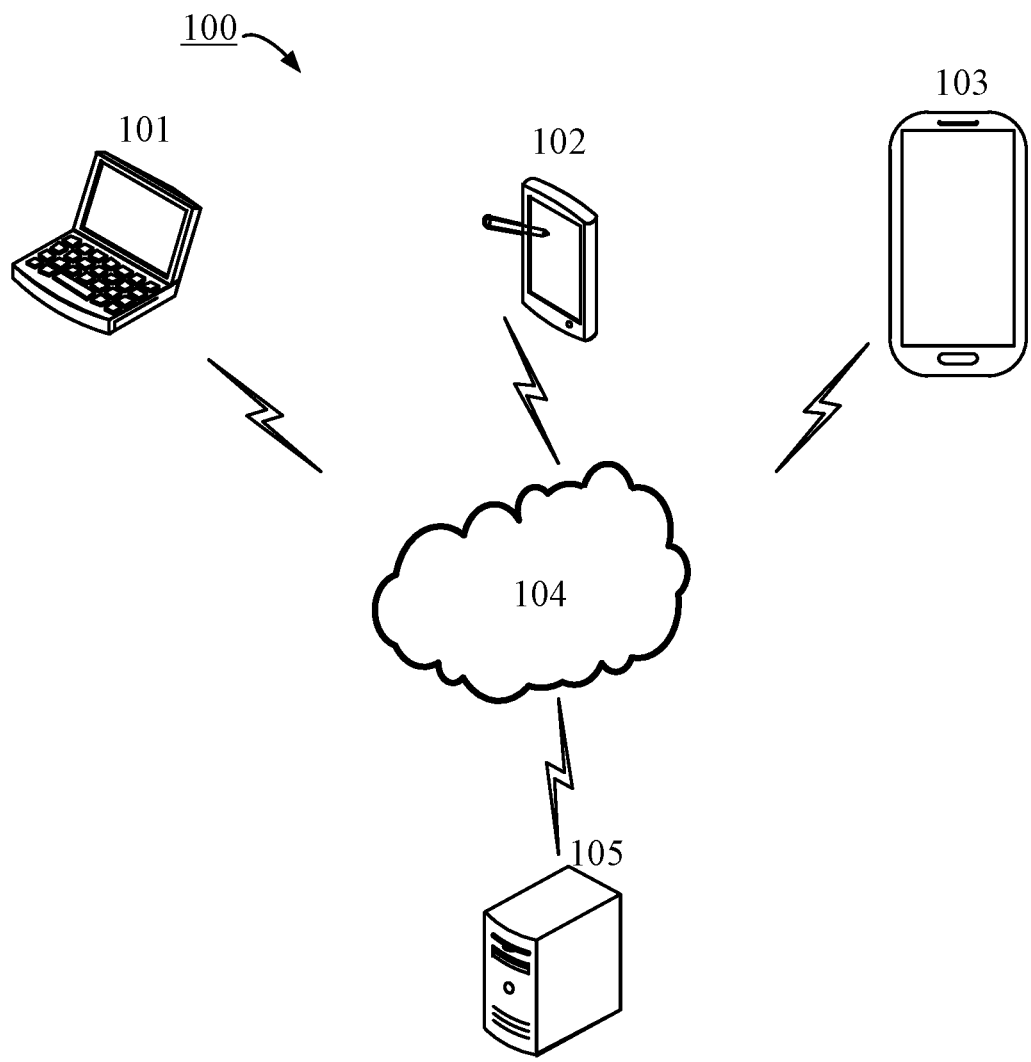
FIG. 1 schematically shows an exemplary system architecture to which a method and an apparatus of rectifying a text image and a method and an apparatus of training a text image rectification model may be applied according to embodiments of the present disclosure.

FIG. 1 schematically shows an exemplary system architecture to which a method and an apparatus of rectifying a text image and a method and an apparatus of training a text image rectification model may be applied according to embodiments of the present disclosure.

It should be noted that FIG. 1 is merely an example of the system architecture to which embodiments of the present disclosure may be applied to help those skilled in the art understand the technical content of the present disclosure, but it does not mean that embodiments of the present disclosure may not be applied to other devices, systems, environments or scenarios. For example, in other embodiments, an exemplary system architecture to which a method and an apparatus of rectifying a text image and a method and an apparatus of training a text image rectification model may be applied may include a terminal device, but the terminal device may implement the method and the apparatus of rectifying the text image and the method and the apparatus of training the text image rectification model provided by embodiments of the present disclosure with out interacting with a server.

As shown in FIG. 1, a system architecture 100 according to such embodiments may include terminal devices 101, 102 and 103, a network 104, and a server 105. The network 104 is a medium for providing a communication link between the terminal devices 101, 102, 103 and the server 105. The network 104 may include various connection types, such as wired and/or wireless communication links, or the like.

The terminal devices 101, 102 and 103 may be used by a user to interact with the server 105 through the network 104 to receive or send messages or the like. The terminal devices 101, 102 and 103 may be installed with various communication client applications, such as knowledge reading applications, web browser applications, search applications, instant messaging tools, email clients and/or social platform software, etc. (for example only).

The terminal devices 101, 102 and 103 may be various electronic devices having display screens and supporting web browsing, including but not limited to smart phones, tablet computers, laptop computers, desktop computers, or the like.

The server 105 may be various types of servers providing various services. For example, the server 105 may be a cloud server, also known as a cloud computing server or a cloud host, which is a host product in a cloud computing service system to solve shortcomings of difficult management and weak service scalability existing in an existing physical host and VPS (Virtual Private Server) service. The server 105 may also be a server of a distributed system or a server combined with a block-chain.

It should be noted that the method of rectifying the text image provided by embodiments of the present disclosure may generally be performed by the terminal device 101, 102 or 103. Accordingly, the apparatus of rectifying the text image provided by embodiments of the present disclosure may also be provided in the terminal device 101, 102 or 103.

Alternatively, the method of rectifying the text image provided by embodiments of the present disclosure may generally be performed by the server 105. Accordingly, the apparatus of rectifying the text image provided by embodiments of the present disclosure may be generally provided in the server 105. The method of rectifying the text image provided by embodiments of the present disclosure may also be performed by a server or server cluster different from the server 105 and capable of communicating with the terminal devices 101, 102, 103 and/or the server 105. Accordingly, the apparatus of rectifying the text image provided by embodiments of the present disclosure may also be provided in a server or server cluster different from the server 105 and capable of communicating with the terminal devices 101, 102, 103 and/or the server 105.

The method of training the text image rectification model provided by embodiments of the present disclosure may generally be performed by the server 105. Accordingly, the apparatus of training the text image rectification model provided by embodiments of the present disclosure may be generally provided in the server 105. The method of training the text image rectification model provided by embodiments of the present disclosure may also be performed by a server or server cluster different from the server 105 and capable of communicating with the terminal devices 101, 102, 103 and/or the server 105. Accordingly, the apparatus of training the text image rectification model provided by embodiments of the present disclosure may also be provided in a server or server cluster different from the server 105 and capable of communicating with the terminal devices 101, 102, 103 and/or the server 105.

The method of training the text image rectification model provided by embodiments of the present disclosure may generally be performed by the terminal device 101, 102 or 103. Accordingly, the apparatus of training the text image rectification model provided by embodiments of the present disclosure may also be provided in the terminal device 101, 102 or 103.

It should be understood that the number of terminal devices, network and server shown in FIG. 1 are merely schematic. According to implementation needs, any number of terminal devices, networks and servers may be provided.

FIG. 2 schematically shows a flowchart of a method of rectifying a text image according to embodiments of the present disclosure.

As shown in FIG. 2, a method 200 includes operation S210 to operation S220.

In operation S210, a plurality of first layer-wise processing is performed on a text image to be rectified based on a gating strategy, so as to obtain respective feature maps of a plurality of layer levels. Each feature map includes a text structural feature related to the text image to be rectified, and the gating strategy is used to increase an attention to the text structural feature.

In operation S220, a plurality of second layer-wise processing is performed on the respective feature maps of the plurality of layer levels, so as to obtain a rectified text image corresponding to the text image to be rectified.

According to embodiments of the present disclosure, the text image may refer to an image containing a text. The text image may be captured by a capture device. The capture device may include a camera. The text image to be rectified may refer to a text image having at least one selected from twisting, bending, or wrinkling. The text structural feature may include at least one selected from: a text line, a text block, a graph boundary, or a text boundary.

According to embodiments of the present disclosure, the text structural feature has a guiding function in a text rectification, and it is necessary to increase the attention to the text structural feature. Therefore, a gating strategy may be generated for increasing the attention to the text structural feature. For example, it is possible to increase the attention to the text structural feature from at least one selected from a channel layer level, a fine-grain layer level, or a coarse-grain layer level. The channel layer level may refer to a channel layer level of the feature map. Different channels may have different functions, and the function of channel may be represented by a channel weight. The fine-grain layer level may refer to a pixel layer level of the feature map. Different pixels may have different functions, and the function of pixel may be represented by a pixel weight. The coarse-grain layer level may refer to a spatial layer level. The gating strategy may include at least one selected from a channel layer level strategy, a fine-grain layer level strategy or a coarse-grain layer level strategy. The channel layer level strategy may refer to a strategy for determining the weight of each channel in the feature map. The fine-grain layer level strategy may refer to a strategy for determining the weight of each pixel from a global perspective. The coarse-grain layer level strategy may refer to a strategy for providing a more precise text structural feature.

According to embodiments of the present disclosure, a resolution of the text image to be rectified is the same as that of the rectified text image.

According to embodiments of the present disclosure, the first layer-wise processing may include feature extraction, down-sampling, fusion, and the like. The second layer-wise processing may include feature extraction, up-sampling, fusion, and the like. There may be a plurality of layer levels. Each layer level may have corresponding first layer-wise processing and second layer-wise processing. A plurality of first layer-wise processing may be performed on the text image to be rectified based on the gating strategy, so as to obtain the feature map corresponding to each of the plurality of layer levels. For example, a plurality of first layer-wise processing may be performed on the text image to be rectified based on at least one selected from the channel layer level strategy, the fine-grain layer level strategy and the coarse-grain layer level strategy, so as to obtain the respective feature maps of the plurality of layer levels. After the respective feature maps of the plurality of layer levels are obtained, a plurality of second layer-wise processing may be performed on the respective feature maps of the plurality of layer levels based on the gating strategy, so as to obtain the rectified text image corresponding to the text image to be rectified. For example, a plurality of second layer-wise processing may be performed on the respective feature maps of the plurality of layer levels based on the coarse-grain layer level strategy, so as to obtain the rectified text image corresponding to the text image to be rectified.

According to embodiments of the present disclosure, the gating strategy may be used to increase the attention to the text structural feature, and the text structural feature has a guiding function in the text image rectification. Therefore, by obtaining the respective feature maps of the plurality of layer levels including the text structural feature of the text image to be rectified based on the gating strategy, and processing the respective feature maps of the plurality of layer levels, it is possible to reduce an adverse effect caused by a local disturbance of dense grids and obtain a rectified text image with a high rectification quality, so that the rectification quality may be improved.

According to embodiments of the present disclosure, operation S210 may include the following operations.

A plurality of first layer-wise processing is performed on the text image to be rectified based on a text image rectification model, so as to obtain respective feature maps of the plurality of layer levels. The text image rectification model may include a gating module, and the gating module is created according to the gating strategy.

According to embodiments of the present disclosure, the gating strategy may be implemented by using the gating module, that is, the gating module may be created according to the gating strategy. The text image rectification model may include a gating module for implementing the gating strategy. The text image rectification model may further include modules related to feature extraction, down-sampling and up-sampling, such as an encoder and a decoder. The encoder may be used to perform feature extraction and down-sampling, and the decoder may be used to perform feature extraction and up-sampling.

According to embodiments of the present disclosure, a plurality of first layer-wise processing may be performed on the text image to be rectified based on the text image rectification model including the gating module, so as to obtain the respective feature maps of the plurality of layer levels. In addition, a plurality of second layer-wise processing may be performed on the respective feature maps of the plurality of layer levels based on the text image rectification model, so as to obtain the rectified text image.

According to embodiments of the present disclosure, the text image rectification model may further include an encoder. The gating module may include a plurality of channel layer units. Each channel layer unit is used to determine a channel weight of each channel in the feature map corresponding to the channel layer unit.

According to embodiments of the present disclosure, performing a plurality of first layer-wise processing on the text image to be rectified based on the text image rectification model so as to obtain the respective feature maps of the plurality of layer levels may include the following operations.

A plurality of first layer-wise processing is performed on the text image to be rectified based on the encoder and the plurality of channel layer units, so as to obtain the respective feature maps of the plurality of layer levels.

According to embodiments of the present disclosure, each layer level has a channel layer unit corresponding to that layer level. Each channel layer unit may be used to process a down-sampling feature map corresponding to that layer level obtained using the encoder, and determine the channel weight of each channel in the down-sampling feature map corresponding to that layer level.

According to embodiments of the present disclosure, the text image rectification model may further include a decoder.

According to embodiments of the present disclosure, operation S220 may include the following operations.

A plurality of second layer-wise processing is performed on the respective feature maps of the plurality of layer levels based on the decoder, so as to obtain the rectified text image corresponding to the text image to be rectified.

According to embodiments of the present disclosure, the decoder may be used to perform the feature extraction and the up-sampling, so that the resolution of the rectified text image is consistent with the resolution of the text image to be rectified.

According to embodiments of the present disclosure, the encoder may include N down-sampling modules connected in cascade. The decoder may include N up-sampling modules connected in cascade. The gating module may include N channel layer units, where N is an integer greater than 1.

According to embodiments of the present disclosure, performing a plurality of first layer-wise processing on the text image to be rectified based on the encoder and the plurality of channel layer units, so as to obtain the respective feature maps of the plurality of layer levels may include the following operations.

For 1 a first down-sampling feature map of an $(i-1)^{th}$ layer level is processed by using an $(i-1)^{th}$ channel layer unit, so as to obtain a channel weight feature map of the $(i-1)^{th}$ layer level. The channel weight feature map of the $(i-1)^{th}$ layer level is processed by using an $i^{th}$ down-sampling module, so as to obtain a first down-sampling feature map of the $i^{th}$ layer level.

According to embodiments of the present disclosure, performing a plurality of second layer-wise processing on the respective feature maps of the plurality of layer levels based on the decoder, so as to obtain the rectified text image corresponding to the text image to be rectified may include the following operations.

For a first output feature map of an $(i+1)^{th}$ layer level is processed by using an $i^{th}$ up-sampling module, so as to obtain a first up-sampling feature map of an $i^{th}$ layer level. The first down-sampling feature map and the first up-sampling feature map of the $i^{th}$ layer level are fused to obtain a first fusion feature map of the $i^{th}$ layer level. The first fusion feature map of the $i^{th}$ layer level is processed by using the $i^{th}$ up-sampling module, so as to obtain a first output feature map of the $i^{th}$ layer level. The rectified text image corresponding to the text image to be rectified is determined according to the first output feature map of a first layer level.

According to embodiments of the present disclosure, the down-sampling module may be used to perform a feature extraction and a down-sampling. The up-sampling module may be used to perform a feature extraction and an up-sampling. The down-sampling module may include a convolution layer and a residual module. A stride of the convolution layer may be set to 2. The up-sampling module may include a de-convolution layer and a residual module. N may be an integer greater than 1, which may be configured according to actual service requirements and is not limited here. For example, N=5. The $i^{th}$ down-sampling module is connected to the $i^{th}$ channel layer unit, and the $i^{th}$ down-sampling module corresponds to the $i^{th}$ up-sampling module, $i \in \{1, 2, \ldots, N-1, N\}$.

According to embodiments of the present disclosure, in a case of i=1, the text image to be rectified may be processed by using a first down-sampling module, so as to obtain a first down-sampling feature map of the first layer level. In a case of 1<i≤N, the first down-sampling feature map of the $(i-1)^{th}$ layer level may be processed by using the $(i-1)^{th}$ channel layer unit, so as to obtain the channel weight feature map of the $(i-1)^{th}$ layer level. The channel weight feature map of the $(i-1)^{th}$ layer level may be processed by using the $i^{th}$ down-sampling module, so as to obtain the first down-sampling feature map of the $i^{th}$ layer level.

According to embodiments of the present disclosure, in a case of i=N, the channel weight feature map of an Nth layer level may be processed by using an $N^{th}$ up-sampling module, so as to obtain the first up-sampling feature map of the $N^{th}$ layer level. The first up-sampling feature map and the first down-sampling feature map of the $N^{th}$ layer level are fused to obtain a first fusion feature map of the $N^{th}$ layer level. The first fusion feature map of the $N^{th}$ layer level is processed by using the $N^{th}$ up-sampling module, so as to obtain a first output feature map of the $N^{th}$ layer level.

According to embodiments of the present disclosure, by determining the channel weight for each channel of the feature map using the channel layer unit, the attention to the text structural feature may be increased from an aspect of the channel layer, which may help to improve the rectification quality.

According to embodiments of the present disclosure, the $(i-1)^{th}$ channel layer unit includes M first processing layer combinations connected in cascade. Each first processing layer combination includes a first processing layer and a second processing layer connected in cascade. Each first processing layer includes Q pooling layers connected in parallel, and each second processing layer includes U first convolution layers connected in cascade, where M, Q and U are all integers greater than or equal to 1.

According to embodiments of the present disclosure, processing the first down-sampling feature map of the $(i-1)^{th}$ layer level by using the $(i-1)^{th}$ channel layer unit to obtain the channel weight feature map of the $(i-1)^{th}$ layer level may include the following operations.

The first down-sampling feature map of the $(i-1)^{th}$ layer level is processed by using the M first processing layer combinations connected in cascade of the $(i-1)^{th}$ channel layer unit, so as to obtain first intermediate feature maps respectively corresponding to the Q first processing layers connected in parallel of the $(i-1)^{th}$ layer level. A first gating map of the $(i-1)^{th}$ layer level may be obtained according to the Q first intermediate feature maps of the $(i-1)^{th}$ layer level. A dot multiplication is performed on the first down-sampling feature map of the $(i-1)^{th}$ layer level and the first gating map of the $(i-1)^{th}$ layer level, so as to obtain a second intermediate feature map of the $(i-1)^{th}$ layer level. The channel weight feature map of the $(i-1)^{th}$ layer level may be obtained according to the first down-sampling feature map and the second intermediate feature map of the $(i-1)^{th}$ layer level.

According to embodiments of the present disclosure, each channel layer unit may include M first processing layer combinations connected in cascade. Each first processing layer combination may include a first processing layer and a second processing layer connected in cascade. That is, an output end of the first processing layer is connected to an input end of the second processing layer. The first processing layer may include Q pooling layers connected in cascade. The second processing layer may include U first convolution layers connected in cascade. And a second processing layer pooling layer and a first convolution layer. That is, an output end of the pooling layer is connected to an input end of the first convolution layer. The input end of the pooling layer in each first processing layer is connected to the output end of the corresponding down-sampling module. The convolution layer included in the first convolution layer may be a 1×1 convolution layer. Values of M, Q and U may be configured according to the actual service needs, which are not limited here.

For example, M=1, Q=U=2. The Q=2 pooling layers connected in parallel may be referred to as a first pooling layer and a second pooling layer, respectively. The U=2 first convolution layers connected in cascade may be referred to as a first convolution sub-layer and a second convolution sub-layer, respectively. For the $(i-1)^{th}$ layer level, the first down-sampling feature map of the $(i-1)^{th}$ layer level may be processed by using the first pooling layer, so as to obtain a fifth intermediate feature map of the $(i-1)^{th}$ layer level. The first down-sampling feature map of the $(i-1)^{th}$ layer level may be processed by using the second pooling layer, so as to obtain a sixth intermediate feature map of the $(i-1)^{th}$ layer level. The fifth intermediate feature map of the $(i-1)^{th}$ layer level may be processed by using the first convolution sub-layer, so as to obtain a seventh intermediate feature map of the $(i-1)^{th}$ layer level. The seventh intermediate feature map of the $(i-1)^{th}$ layer level may be processed by using the second convolution sub-layer, so as to obtain an eighth intermediate feature map of the $(i-1)^{th}$ layer level. The sixth intermediate feature map of the $(i-1)^{th}$ layer level may be processed by using the first convolution sub-layer, so as to obtain a ninth intermediate feature map of the $(i-1)^{th}$ layer level. The ninth intermediate feature map of the $(i-1)^{th}$ layer level may be processed by using the second convolution sub-layer, so as to obtain a tenth intermediate feature map of the $(i-1)^{th}$ layer level. The first gating map of the $(i-1)^{th}$ layer level may be obtained according to the eighth intermediate feature map and the tenth intermediate feature map of the $(i-1)^{th}$ layer level.

According to embodiments of the present disclosure, obtaining the first gating map of the $(i-1)^{th}$ layer level according to the eighth intermediate feature map and the tenth intermediate feature map of the $(i-1)^{th}$ layer level may include: adding the eighth intermediate feature map and the tenth intermediate feature map of the $(i-1)^{th}$ layer level to obtain a concatenated feature map of the $(i-1)^{th}$ layer level. Then, a channel duplication is performed on the concatenated feature map of the $(i-1)^{th}$ layer level, so as to obtain the first gating map of the $(i-1)^{th}$ layer level.

According to embodiments of the present disclosure, obtaining the channel weight feature map of the $(i-1)^{th}$ layer level according to the first down-sampling feature map and the second intermediate feature map of the $(i-1)^{th}$ layer level may include: adding the first down-sampling feature map and the second intermediate feature map of the $(i-1)^{th}$ layer level to obtain the channel weight feature map of the $(i-1)^{th}$ layer level.

According to embodiments of the present disclosure, the gating module may further include a fine-grain layer unit.

According to embodiments of the present disclosure, the above-mentioned method of rectifying a text image may further include the following operations.

The channel weight feature map of the $N^{th}$ layer level is processed by using the fine-grain layer unit, so as to obtain a first fine-grain feature map of the $N^{th}$ layer level.

According to embodiments of the present disclosure, performing a plurality of second layer-wise processing on the respective feature maps of the plurality of layer levels based on the decoder so as to obtain the rectified text image corresponding to the text image to be rectified may include the following operations.

In a case of i=N, the first fine-grain feature map of the $N^{th}$ layer level is processed by using the $N^{th}$ up-sampling module, so as to obtain a first up-sampling feature map of the $N^{th}$ layer level. The first up-sampling feature map and the first down-sampling feature map of the $N^{th}$ layer level are fused to obtain a first fusion feature map of the $N^{th}$ layer level. The first fusion feature map of the $N^{th}$ layer level is processed by using the $N^{th}$ up-sampling module, so as to obtain a first output feature map of the $N^{th}$ layer level.

According to embodiments of the present disclosure, a fine-grain layer unit may be provided between the encoder and the decoder. That is, the fine-grain layer unit is connected to the $N^{th}$ down-sampling module. The fine-grain layer unit is used to determine a pixel weight of each pixel in the first up-sampling feature map of the $N^{th}$ layer level. That is, the channel weight feature map of the $N^{th}$ layer level is processed by using the fine-grain layer unit, so as to obtain a first fine-grain feature map of the $N^{th}$ layer level.

According to embodiments of the present disclosure, by determining the pixel weight for the pixel of the feature map using the fine-grain layer unit, the attention to the text structural feature may be increased from the aspect of the fine-grain layer, which may help improve the rectification quality.

According to embodiments of the present disclosure, the fine-grain layer unit may include P second processing layer combinations connected in parallel. Each second processing layer combination may include V third processing layers connected in parallel, and each third processing layer combination may include S second convolution layers connected in cascade. P, V and S are all integers greater than or equal to 1.

According to embodiments of the present disclosure, processing the channel weight feature map of the $N^{th}$ layer level by using the fine-grain layer unit to obtain the first fine-grain feature map of the $N^{th}$ layer level may include the following operations.

The channel weight feature map of the $N^{th}$ layer level is processed by using the P second processing layer combinations connected in parallel, respectively, so as to obtain third intermediate feature maps respectively corresponding to the P second processing layer combinations connected in parallel. A second gating map of the $N^{th}$ layer level is obtained according to the third intermediate feature maps respectively corresponding to the P second processing layer combinations connected in parallel. A fourth intermediate feature map of the $N^{th}$ layer level is obtained according to the channel weight feature map and the second gating map of the $N^{th}$ layer level. The fine-grain feature map of the $N^{th}$ layer level is obtained according to the channel weight feature map and the fourth intermediate feature map of the $N^{th}$ layer level.

According to embodiments of the present disclosure, the values of P, V and S may be configured according to actual service needs, which are not limited here.

For example, P=1, V=S=2. The channel weight feature map of the $N^{th}$ layer level may be processed by using a first one of the second convolution layers, so as to obtain an eleventh intermediate feature map corresponding to the first one of the second convolution layers. The eleventh intermediate feature map corresponding to the first one of the second convolution layers may be processed by using a second one of the second convolution layers, so as to obtain a twelfth intermediate feature map corresponding to the second one of the second convolution layers, that is, the channel weight feature map of the $N^{th}$ layer level is mapped to a first feature space. The channel weight feature map of the $N^{th}$ layer level may be processed by using a third one of the second convolution layers, so as to obtain a thirteenth intermediate feature map corresponding to the third one of the second convolution layers. The thirteenth intermediate feature map corresponding to the third one of the second convolution layers may be processed by using a fourth one of the second convolution layers, so as to obtain a fourteenth intermediate feature map corresponding to the fourth one of the second convolution layers, that is, the channel weight feature map of the $N^{th}$ layer level is mapped to a second feature space. A third intermediate feature map corresponding to the second processing layer combination may be obtained according to the twelfth intermediate feature map corresponding to the second one of the second convolution layers and the fourteenth intermediate feature map corresponding to the fourth one of the second convolution layers. A second gating map of the $N^{th}$ layer level may be obtained according to the third intermediate feature map corresponding to the second processing layer combination. A fourth intermediate feature map of the $N^{th}$ layer level may be obtained according to the channel weight feature map and the second gating map of the $N^{th}$ layer level. The fine-grain feature map of the $N^{th}$ layer level may be obtained according to the channel weight feature map and the fourth intermediate feature map of the $N^{th}$ layer level.

According to embodiments of the present disclosure, obtaining the second gating map of the $N^{th}$ layer level according to the third intermediate feature map corresponding to the second processing layer combination may include: determining the third intermediate feature map corresponding to the second processing layer combination as the second gating map of the $N^{th}$ layer level.

According to embodiments of the present disclosure, obtaining the third intermediate feature map corresponding to the second processing layer combination according to the twelfth intermediate feature map corresponding to the second one of the second convolution layers and the fourteenth intermediate feature map corresponding to the fourth one of the second convolution layers may include: multiplying the twelfth intermediate feature map corresponding to the second one of the second convolution layers and the fourteenth intermediate feature map corresponding to the fourth one of the second convolution layers to obtain the third intermediate feature map corresponding to the second processing layer combination.

According to embodiments of the present disclosure, obtaining the fourth intermediate feature map of the $N^{th}$ layer level according to the channel weight feature map and the second gating map of the $N^{th}$ layer level may include: multiplying the channel weight feature map and the second gating map of the $N^{th}$ layer level to obtain the fourth intermediate feature map of the $N^{th}$ layer level. Obtaining the fine-grain feature map of the $N^{th}$ layer level according to the channel weight feature map and the fourth intermediate feature map of the $N^{th}$ layer level which include: adding the channel weight feature map of the $N^{th}$ layer level and the fourth intermediate feature map of the $N^{th}$ layer level to obtain the fine-grain feature map of the $N^{th}$ layer level.

According to embodiments of the present disclosure, the gating module may further include N coarse-grain layer units.

The first down-sampling feature map of the $i^{th}$ layer level is processed by using an $i^{th}$ coarse-grain layer unit, so as to obtain a first coarse-grain feature map of the $i^{th}$ layer level.

According to embodiments of the present disclosure, fusing the first down-sampling feature map of the $i^{th}$ layer level and the first up-sampling feature map of the $i^{th}$ layer level to obtain the first fusion feature map of the $i^{th}$ layer level may include the following operations.

The first coarse-grain feature map of the $i^{th}$ layer level and the first up-sampling feature map of the $i^{th}$ layer level are fused to obtain the first fusion feature map of the $i^{th}$ layer level.

According to embodiments of the present disclosure, the coarse-grain layer unit may be used to provide a more precise text structural feature. The $i^{th}$ coarse-grain layer unit may be connected to the $i^{th}$ down-sampling module.

According to embodiments of the present disclosure, by combining the coarse-grain layer unit with a skip connection, the respective feature maps of the plurality of layer levels in the encoder may be transferred directly to the decoders of the corresponding layer levels, which may help to provide a more precise text structural feature on the basis of decoding, so that the rectification quality may be improved.

According to embodiments of the present disclosure, the $i^{th}$ coarse-grain layer unit may include T dilated convolution layers connected in cascade. Different dilated convolution layers have different convolution dilation rates, and T is an integer greater than or equal to 1.

According to embodiments of the present disclosure, processing the first down-sampling feature map of the $i^{th}$ layer level by using the $i^{th}$ coarse-grain layer unit to obtain the first coarse-grain feature map of the $i^{th}$ layer level may include the following operations.

The first down-sampling feature map of the $i^{th}$ layer level is processed by using the T dilated convolution layers connected in cascade of the $i^{th}$ layer level, so as to obtain a third gating map of the $i^{th}$ layer level. A dot multiplication is performed on the first down-sampling feature map and the third gating map of the $i^{th}$ layer level, so as to obtain the first coarse-grain feature map of the $i^{th}$ layer level.

According to embodiments of the present disclosure, each coarse-grain layer may include T dilated convolution layers connected in cascade. Different dilated convolution layers may have different convolution dilation rates. For example, the convolution dilation rate may increase with an increase of a cascade level. A value of T may be configured according to actual service needs, which is not limited here.

According to embodiments of the present disclosure, the first down-sampling feature map of the $i^{th}$ layer level may be processed by using the T dilated convolution layers connected in cascade, so as to obtain T ninth intermediate feature maps. A third gating map of the $i^{th}$ layer level may be obtained according to the T ninth intermediate feature maps. For example, the T ninth intermediate feature maps may be added to obtain the third gating map of the $i^{th}$ layer level.

For example, T=3. The T=3 dilated convolution layers connected in cascade may be referred to as a first dilated convolution layer, a second dilated convolution layer, and a third dilated convolution layer. The convolution dilation rate of the first dilated convolution layer is 1. The convolution dilation rate of the second dilated convolution layer is 2. The convolution dilation rate of the third dilated convolution layer is 4. The first down-sampling feature map of the $i^{th}$ layer level may be processed by using the first dilated convolution layer to obtain a first one of the ninth intermediate feature maps of the $i^{th}$ layer level. The first one of the ninth intermediate feature maps of the $i^{th}$ layer level may be processed by using the second dilated convolution layer to obtain a second one of the ninth intermediate feature maps of the $i^{th}$ layer level. The second one of the ninth intermediate feature maps of the $i^{th}$ layer level may be processed by using the third dilated convolution layer to obtain a third one of the ninth intermediate feature maps of the $i^{th}$ layer level. The first one of the ninth intermediate feature maps, the second one of the ninth intermediate feature maps and the third one of the ninth intermediate feature maps of the $i^{th}$ layer level may be added to obtain the third gating map of the $i^{th}$ layer level.

According to embodiments of the present disclosure, the text image rectification model may further include an encoder and a decoder. The gating module may include a fine-grain layer unit.

According to embodiments of the present disclosure, performing a plurality of first layer-wise processing on the text image to be rectified based on the text image rectification model so as to obtain respective feature maps of the plurality of layer levels may include the following operations.

A plurality of first layer-wise processing is performed on the text image to be rectified based on the encoder and the fine-grain layer unit, so as to obtain the respective feature maps of the plurality of layer levels.

According to embodiments of the present disclosure, performing a plurality of second layer-wise processing on the respective feature maps of the plurality of layer levels to obtain the rectified text image corresponding to the text image to be rectified may include the following operations.

A plurality of second layer-wise processing is performed on the respective feature maps of the plurality of layer levels based on the decoder, so as to obtain the rectified text image corresponding to the text image to be rectified.

According to embodiments of the present disclosure, the fine-grain layer unit may be used to process the down-sampling feature map corresponding to a last layer level obtained by using the encoder, and determine the pixel weight of each pixel in the down-sampling feature map corresponding to the last layer level.

According to embodiments of the present disclosure, the encoder may include N down-sampling modules connected in cascade. The decoder may include N up-sampling modules connected in cascade. N is an integer greater than 1.

According to embodiments of the present disclosure, performing a plurality of first layer-wise processing on the text image to be rectified based on the encoder and the fine-grain layer unit, so as to obtain the respective feature maps of the plurality of layer levels may include the following operations.

In a case of 1<i≤N, the second down-sampling feature map of the $(i-1)^{th}$ layer level is processed by using the $i^{th}$ down-sampling module, so as to obtain a second down-sampling feature map of the $i^{th}$ layer level. The second down-sampling feature map of the $N^{th}$ layer level is processed by using the fine-grain layer unit, so as to obtain a second fine-grain feature map of the $N^{th}$ layer level.

According to embodiments of the present disclosure, performing a plurality of second layer-wise processing on the respective feature maps of the plurality of layer levels based on the decoder, so as to obtain the rectified text image corresponding to the text image to be rectified may include the following operations.

In a case of i=N, the fine-grain feature map of the $N^{th}$ layer level may be processed by using the $N^{th}$ up-sampling module, so as to obtain a second up-sampling feature map of the $N^{th}$ layer level. The second up-sampling feature map and the second down-sampling feature map of the $N^{th}$ layer level may be fused to obtain a second fusion feature map of the $N^{th}$ layer level. The second fusion feature map of the $N^{th}$ layer level may be processed by using the $N^{th}$ up-sampling module, so as to obtain a second output feature map of the $N^{th}$ layer level. In a case of 1≤i<N, a second output feature map of the $(i+1)^{th}$ layer level may be processed by using the $i^{th}$ up-sampling module, so as to obtain a second up-sampling feature map of the $i^{th}$ layer level. The second down-sampling feature map and the second up-sampling feature map of the $i^{th}$ layer level may be fused to obtain a second fusion feature map of the $i^{th}$ layer level. The second fusion feature map of the $i^{th}$ layer level may be processed by using the $i^{th}$ up-sampling module, so as to obtain a second output feature map of the $i^{th}$ layer level. The rectified text image corresponding to the text image to be rectified may be obtained according to the second output feature map of the first layer level.

According to embodiments of the present disclosure, the $N^{th}$ down-sampling module is connected to the fine-grain layer unit. The $i^{th}$ down-sampling module corresponds to the $i^{th}$ up-sampling module. i∈{1, 2, . . . , N−1, N}.

According to embodiments of the present disclosure, in a case of 1=1, the text image to be rectified may be processed by using a first down-sampling module, so as to obtain a second down-sampling feature map of the first layer level.

According to embodiments of the present disclosure, for a structure of the fine-grain layer unit, reference may be made to a structure of the fine-grain layer unit described above, which will not be repeated here.

According to embodiments of the present disclosure, the text image rectification model may further include an encoder and a decoder. The gating module may include a plurality of coarse-grain layer units.

According to embodiments of the present disclosure, performing a plurality of first layer-wise processing on the text image to be rectified based on the text image rectification model, so as to obtain respective feature maps of the plurality of layer levels may include the following operations.

A plurality of first layer-wise processing is performed on the text image to be rectified based on the encoder and a plurality of coarse-grain layer units, so as to obtain the respective feature maps of the plurality of layer levels.

According to embodiments of the present disclosure, performing a plurality of second layer-wise processing on the respective feature maps of the plurality of layer levels to obtain the rectified text image corresponding to the text image to be rectified may include the following operations.

A plurality of second layer-wise processing is performed on the respective feature maps of the plurality of layer levels based on the decoder, so as to obtain the rectified text image corresponding to the text image to be rectified.

According to embodiments of the present disclosure, each layer level has a coarse-grain layer unit corresponding to that layer level. Each coarse-grain layer unit may be used to provide a more precise text structural feature corresponding to that layer level.

According to embodiments of the present disclosure, the encoder may include N down-sampling modules connected in cascade. The decoder may include N up-sampling modules connected in cascade. The gating module may include N coarse-grain layer units. N is an integer greater than 1.

According to embodiments of the present disclosure, performing a plurality of first layer-wise processing on the text image to be rectified based on the encoder and a plurality of coarse-grain layer units, so as to obtain the respective feature maps of the plurality of layer levels may include the following operations.

In a case of $1<i \leq N$, the second down-sampling feature map of the $(i-1)^{th}$ layer level may be processed by using the $i^{th}$ down-sampling module, so as to obtain a second down-sampling feature map of the $i^{th}$ layer level. The second down-sampling feature map of the $i^{th}$ layer level may be processed by using an $i^{th}$ coarse-grain layer unit, so as to obtain a second coarse-grain feature map of the $i^{th}$ layer level.

According to embodiments of the present disclosure, performing a plurality of second layer-wise processing on the respective feature maps of the plurality of layer levels based on the decoder, so as to obtain the rectified text image corresponding to the text image to be rectified may include the following operations.

In a case of $1 \leq i<N$, a third output feature map of the $(i+1)^{th}$ layer level may be processed by using the $i^{th}$ up-sampling module, so as to obtain a third output feature map of the $i^{th}$ layer level. The second coarse-grain feature map and the third output feature map of the $i^{th}$ layer level may be fused to obtain a third fusion feature map of the $i^{th}$ layer level. The third fusion feature map of the $i^{th}$ layer level may be processed by using the $i^{th}$ up-sampling module, so as to obtain a third output feature map of the $i^{th}$ layer level. The rectified text image corresponding to the text image to be rectified may be determined according to the third output feature map of the first layer level.

According to embodiments of the present disclosure, in a case of i=1, the text image to be rectified may be processed by using the first down-sampling module, so as to obtain a second down-sampling feature map of the first layer level. The second down-sampling feature map of the first layer level may be processed by using the first coarse-grain layer unit, so as to obtain a second coarse-grain feature map of the first layer level.

According to embodiments of the present disclosure, in a case of i=N, the second down-sampling feature map of the $N^{th}$ layer level may be processed by using the $N^{th}$ up-sampling module, so as to obtain a third output feature map of the $N^{th}$ layer level. The second coarse grain feature map and the third output feature map of the $N^{th}$ layer level may be fused to obtain a third fusion feature map of the $N^{th}$ layer level. The third fusion feature map of the $N^{th}$ layer level may be processed by using the $N^{th}$ up-sampling module, so as to obtain a third output feature map of the $N^{th}$ layer level.

According to embodiments of the present disclosure, for a structure of the coarse-grain layer unit, reference may be made to the structure of the coarse-grain layer unit described above, which will not be repeated here.

According to embodiments of the present disclosure, the above-mentioned method of rectifying the text image may further include the following operations.

A text recognition is performed on the rectified text image to obtain a text recognition result.

According to embodiments of the present disclosure, after the rectified text image is obtained, a text recognition may be performed on the rectified text image by using a text recognition model, so as to obtain a text recognition result.

According to embodiments of the present disclosure, by rectifying the text image to be rectified using the method of rectifying the text image described in the present disclosure, the rectification quality may be improved. On this basis, the recognition is performed on the rectified text image, and a text recognition rate may be improved, so as to promote a development and an application related to fields of navigation and scene understanding.

Referring to FIG. 3A, FIG. 3B, FIG. 3C, FIG. 3D and FIG. 3E, the method of rectifying the text image described in embodiments of the present disclosure will be further described in combination with specific embodiments.

Figure 3A:
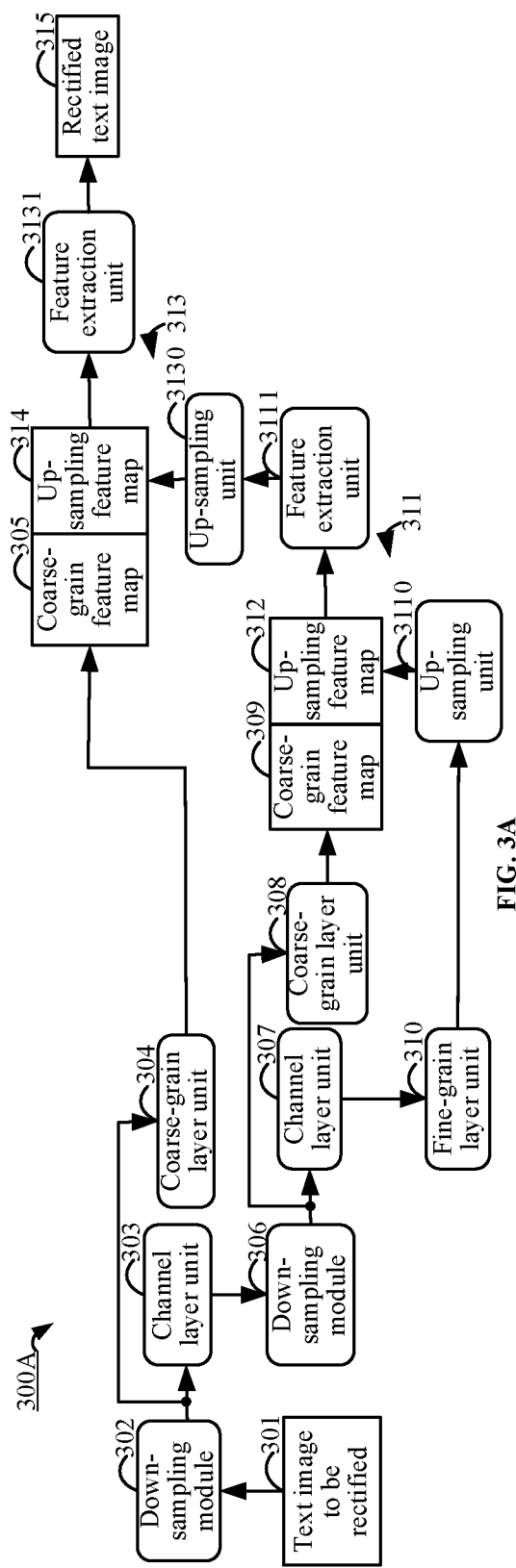
FIG. 3A schematically shows an example schematic diagram of a process of rectifying a text image according to embodiments of the present disclosure.

FIG. 3A schematically shows an example schematic diagram of a text image rectification process according to embodiments of the present disclosure.

As shown in FIG. 3A, in 300A, the text image rectification model includes an encoder, a decoder, and a gating module. N=2.

The encoder includes two down-sampling modules connected in cascade, including a down-sampling module 302 and a down-sampling module 306. The decoder includes two up-sampling modules connected in cascade, including an up-sampling module 311 and an up-sampling module 313. The up-sampling module 311 includes an up-sampling unit 3110 and a feature extraction unit 3111. The up-sampling module 313 includes an up-sampling unit 3130 and a feature extraction unit 3131.

The gating module includes a channel layer unit 303 and a coarse-grain layer unit 304 of the first layer level, and a channel layer unit 307, a coarse-grain layer unit 308 and a fine-grain layer unit 310 of the second layer level.

A text image to be rectified 301 may be processed by using the down-sampling module 302, so as to obtain the first down-sampling feature map of the first layer level.

The first down-sampling feature map of the first layer level may be processed by using the channel layer unit 303, so as to obtain the channel weight feature map of the first layer level. The first down-sampling feature map of the first layer level may be processed by using the coarse-grain layer unit 304, so as to obtain a first coarse-grain feature map 305 of the first layer level.

The channel weight feature map of the first layer level may be processed by using the down-sampling module 306, so as to obtain a first down-sampling feature map of the second layer level. The first down-sampling feature map of the second layer level may be processed by using the channel layer unit 307, so as to obtain a channel weight feature map of the second layer level. The first down-sampling feature map of the second layer level may be processed by using the coarse-grain layer unit 308, so as to obtain a first coarse-grain feature map 309 of the second layer level.

The channel weight feature map of the second layer level may be processed by using the fine-grain layer unit 310, so as to obtain a first fine-grain feature map of the second layer level.

The first fine-grain feature map of the second layer level may be processed by using the up-sampling unit 3110, so as to obtain a first up-sampling feature map 312 of the second layer level. The first up-sampling feature map 312 and the first coarse-grain feature map 309 of the second layer level may be concatenated to obtain a first fusion feature map of the second layer level. The first fusion feature map of the second layer level may be processed by using the feature extraction unit 3111, so as to obtain a first output feature map of the second layer level.

The first output feature map of the second layer level may be processed by using the up-sampling unit 3130, so as to obtain a first up-sampling feature map 314 of the first layer level. The first up-sampling feature map 314 and the coarse-grain feature map 305 of the first layer level may be concatenated to obtain a first fusion feature map of the first layer level. The first fusion feature map of the first layer level may be processed by using the feature extraction unit 3131, so as to obtain a first output feature map of the first layer level. A rectified text image 315 corresponding to the text image to be rectified 301 may be determined according to the first output feature map of the first layer level.

Figure 3B:
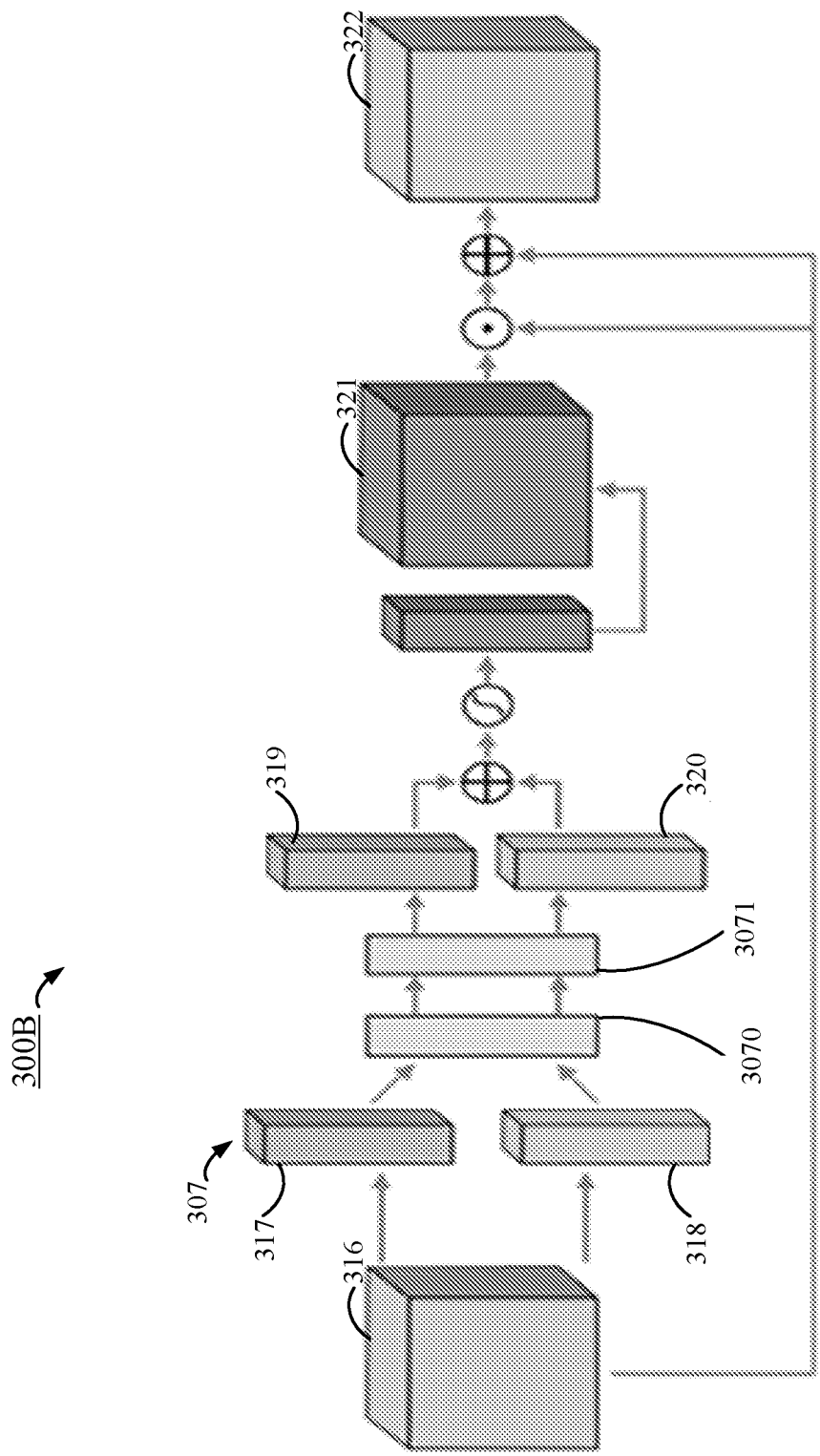
FIG. 3B schematically shows an example schematic diagram of a process of processing a first down-sampling feature map using a channel layer unit to obtain a channel weight feature map according to embodiments of the present disclosure.

FIG. 3B schematically shows an example schematic diagram of a process of processing the first down-sampling feature map using a channel layer unit to obtain a channel weight feature map according to embodiments of the present disclosure.

As shown in FIG. 3B, in 300B, a channel layer unit 307 in FIG. 3A includes M=1 first processing layer combination. The first processing layer combination includes a first processing layer and a second processing layer. The first processing layer includes Q=2 pooling layers connected in parallel, including a first pooling layer and a second pooling layer. The second processing layer includes U=2 first convolution layers connected in cascade, including a first convolution layer 3070 and a first convolution layer 3071. The first pooling layer is a max-pooling layer. The second pooling layer is an average-pooling layer. The first convolution layer 3070 and the second convolution layer 3071 are both 1×1 convolution layers.

For the second layer level, a first down-sampling feature map 316 of the second layer level may be processed by using the first pooling layer to obtain a fifth intermediate feature map 317 of the second layer level. A dimension of the first down-sampling feature map of the second layer level is C×H×W. A dimension of the fifth intermediate feature map 317 of the second layer level is C×1×1. C represents a number of channels, H represents a height, and W represents a width. The first down-sampling feature map 316 of the second layer level may be processed by using the second pooling layer to obtain a sixth intermediate feature map 318 of the second layer level. A dimension of the sixth intermediate feature map 318 of the second layer level is C×1×1. The fifth intermediate feature map 317 of the second layer level may be processed by using the first convolution layer 3070 to obtain a seventh intermediate feature map of the second layer level. The seventh intermediate feature map of the second layer level may be processed by using the second convolution layer 3071 to obtain an eighth intermediate feature map 319 of the second layer level. A dimension of the eighth intermediate feature map 319 of the second layer level is C×1×1. The sixth intermediate feature map of the second layer level may be processed by using the first convolution layer 3070 to obtain a ninth intermediate feature map of the second layer level. The ninth intermediate feature map of the second layer level may be processed by using the second convolution layer 3071 to obtain a tenth intermediate feature map 320 of the second layer level. A dimension of the tenth intermediate feature map 320 of the second layer level is C×1×1. The eighth intermediate feature map 319 and the tenth intermediate feature map 320 of the second layer level may be added to obtain a concatenated feature map of the second layer level. The concatenated feature map of the second layer level may be processed by using a first activation function to obtain a processed concatenated feature map of the second layer level. The first activation function may be a Tanh function. Then, a channel duplication may be performed on the processed concatenated feature map of the second layer level to obtain a first gating map 321 of the second layer level. A dimension of the first gating map 321 of the second layer level is C×H×W. A dot multiplication may be performed on the first down-sampling feature map of the second layer level and the first gating map 321 of the second layer level to obtain a second intermediate feature map of the second layer level. The first down-sampling feature map and the second intermediate feature map of the second layer level may be added to obtain a channel weight feature map 322 of the second layer level. A dimension of the channel weight feature map 322 of the second layer level is C×H×W.

Figure 3C:
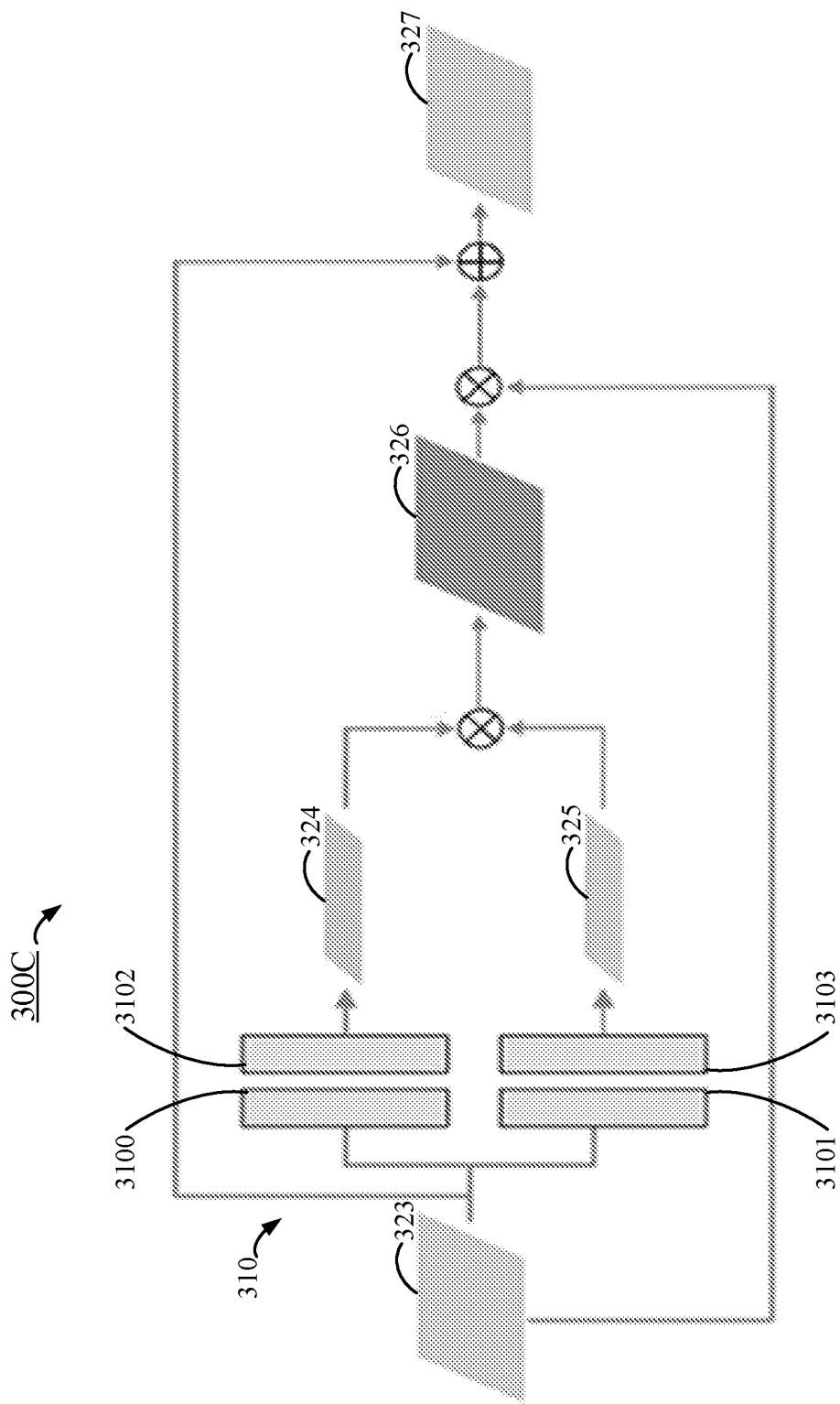
FIG. 3C schematically shows an example schematic diagram of a process of processing a channel weight feature map using a fine-grain layer unit to obtain a first fine-grain feature map according to embodiments of the present disclosure.

FIG. 3C schematically shows an example schematic diagram of a process of processing the channel weight feature map using the fine-grain layer unit to obtain a first fine-grain feature map according to embodiments of the present disclosure.

As shown in FIG. 3C, in 300C, the fine-grain layer unit 310 in FIG. 3A includes P=1 second processing layer combination. The second processing layer combination includes V=2 third processing layers connected in parallel, and each third processing layer includes W=2 second convolution layers connected in cascade, that is, a second convolution layer 3100, a second convolution layer 3101, a second convolution layer 3102, and a second convolution layer 3103. The second convolution layer 3100 and the second convolution layer 3102 are connected in cascade. The second convolution layer 3101 and the second convolution layer 3103 are connected in cascade. The second convolution layer 3100, the second convolution layer 3101, the second convolution layer 3102 and the second convolution layer 3103 are all 1×1 convolution layers.

The dimension of the channel weight feature map 322 of the second layer level may be changed to obtain a changed channel weight feature map 323 of the second layer level. The dimension of the changed channel weight feature map 323 of the second layer level is C×K. K=H×W. The changed channel weight feature map 323 of the second layer level may be processed by using the second convolution layer 3100 and the second convolution layer 3102 to obtain an eleventh intermediate feature map 324 of the second layer level. A dimension of the eleventh intermediate feature map 324 of the second layer level is $$\frac{C}{8} \times K.$$

The changed channel weight feature map 323 of the second layer level may be processed by using the second convolution layer 3101 and the second convolution layer 3103 to obtain a twelfth intermediate feature map 325 of the second layer level. A dimension of the twelfth intermediate feature map 325 of the second layer level is $$\frac{C}{8} \times K.$$

A multiplication may be performed on the eleventh intermediate feature map 324 and the twelfth intermediate feature map 325 of the second layer level based on a second activation function to obtain a second gating map 326 of the second layer level. The second activation function may be a Softmax function. A dimension of the second gating map of the second layer level is K×K. The second gating map 326 and the changed channel weight feature map 323 of the second layer level may be added to obtain a first fine-grain feature map 327 of the second layer level. A dimension of the first fine-grain feature map 327 of the second layer level is C x K.

Figure 3D:
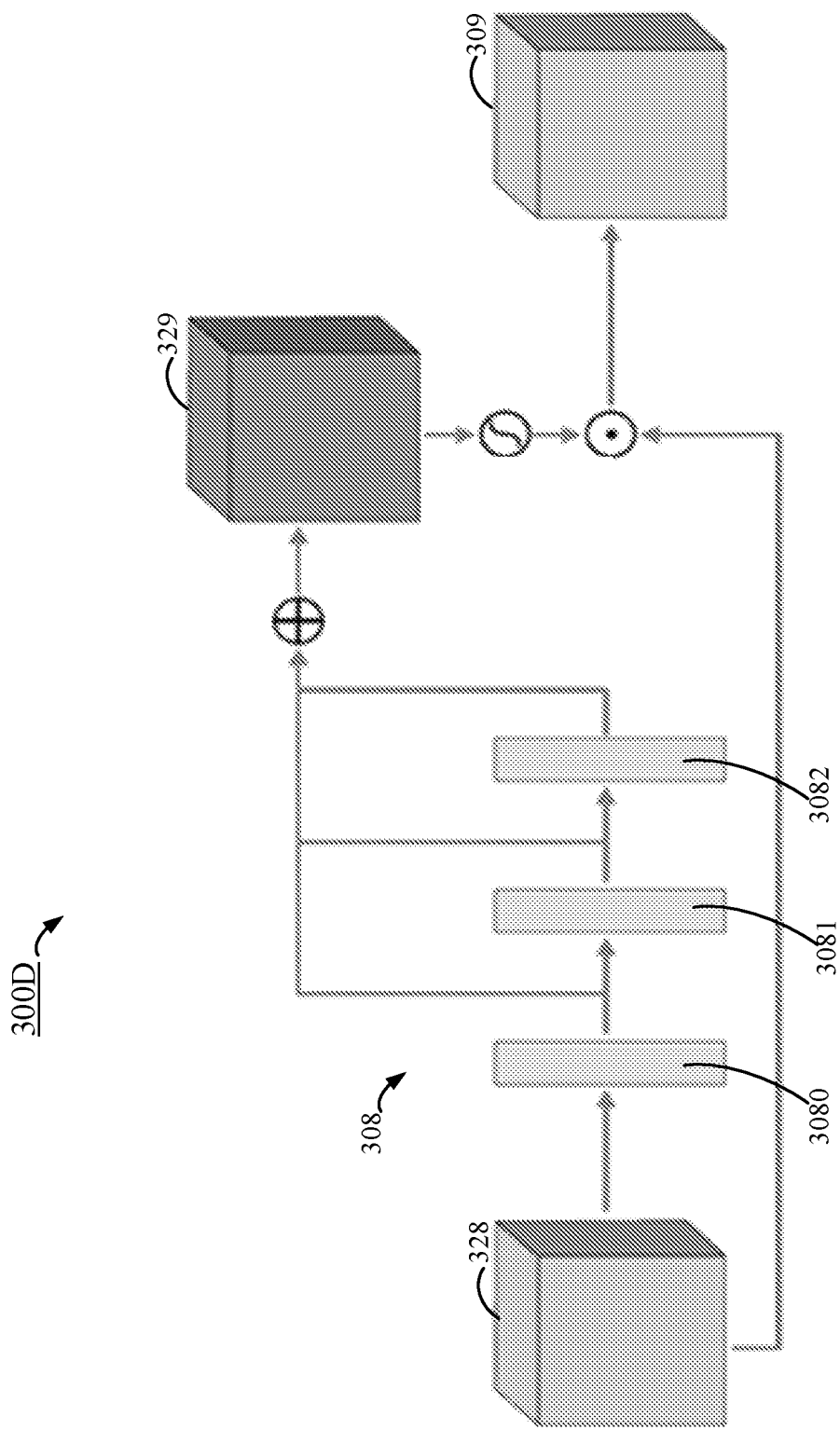
FIG. 3D schematically shows an example schematic diagram of a process of processing a first down-sampling feature map of a second layer level using a coarse-grain layer unit to obtain a first coarse-grain feature map of the second layer level according to embodiments of the present disclosure.

FIG. 3D schematically shows an example schematic diagram of a process of processing a first down-sampling feature map of the second layer level using the coarse-grain layer unit to obtain a first coarse-grain feature map of the second layer level according to embodiments of the present disclosure.

As shown in FIG. 3D, in 300D, the coarse-grain layer unit 308 in FIG. 3A includes T=3 dilated convolution layers connected in cascade, including a dilated convolution layer 3080, a dilated convolution layer 3081, and a dilated convolution layer 3082. A convolution dilation rate of the dilated convolution layer 3080 is 1. A convolution dilation rate of the dilated convolution layer 3081 is 2. A convolution dilation rate of the dilated convolution layer 3082 is 4.

The first down-sampling feature map 328 of the second layer level may be processed by using the dilated convolution layer 3080 to obtain a first one of the eleventh intermediate feature maps of the second layer level. A dimension of the first down-sampling feature map 328 of the second layer level is C×H×W. The first one of the eleventh intermediate feature maps of the second layer level may be processed by using the dilated convolution layer 3081 to obtain a second one of the eleventh intermediate feature maps of the second layer level. The second one of the eleventh intermediate feature maps of the second layer level may be processed by using the dilated convolution layer 3082 to obtain a third one of the eleventh intermediate feature maps of the second layer level. The first one of the eleventh intermediate feature maps, the second one of the eleventh intermediate feature maps and the third one of the eleventh intermediate feature maps of the second layer level may be added to obtain a third gating map 329 of the second layer level. A dimension of the third gating map 329 of the second layer level is C×H×W. The third gating map 329 of the second layer level may be processed by using a third activation function to obtain a processed third gating map of the second layer level. The third activation function may be a Sigmoid function. A dot multiplication may be performed on the first down-sampling feature map 328 and the processed third gating map of the second layer level to obtain the first coarse-grain feature map 309 of the second layer level. A dimension of the first coarse-grain feature map 309 of the second layer level is C×H×W.

Figure 3E:
FIG. 3E schematically shows an example schematic diagram of a text image to be rectified, a rectified text image and a normal text image according to embodiments of the present disclosure.

FIG. 3E schematically shows an example schematic diagram of a text image to be rectified, a rectified text image, and a normal text image according to embodiments of the present disclosure.

As shown in FIG. 3E, in 300E, the text image to be rectified 301 in FIG. 3A is processed using the method of rectifying the text image described in embodiments of the present disclosure, so as to obtain a rectified text image 315.

Comparing the rectified text image 315 with the normal text image 330 corresponding to the text image to be rectified, it may be concluded that the method of rectifying the text image described in embodiments of the present disclosure may achieve a high rectification quality.

FIG. 4 schematically shows a flowchart of a method of training a text image rectification model according to the present disclosure.

As shown in FIG. 4, a method 400 includes operations S410 to S430.

In operation S410, a plurality of first layer-wise processing is performed on a sample text image to be rectified based on a gating strategy, so as to obtain respective sample feature maps of a plurality of layer levels. Each sample feature map includes a text structural feature related to the sample text image to be rectified, and the gating strategy is used to increase an attention to the text structural feature.

In operation S420, a plurality of second layer-wise processing is performed on the respective sample feature maps of the plurality of layer levels, so as to obtain respective prediction results of the plurality of layer levels.

In operation S430, a predetermined model is trained using the respective prediction results and real results of the plurality of layer levels, so as to obtain a text image rectification model.

According to embodiments of the present disclosure, the predetermined model may include an encoder, a decoder, and a gating module. The gating module may include at least one selected from: a fine-grain layer unit, a plurality of channel layer units, and a plurality of coarse-grain layer units. For example, the predetermined model may include an encoder, a decoder, and a gating module. The encoder includes N down-sampling modules. The decoder includes N up-sampling modules. The gating module includes a fine-grain layer unit, N channel layer units and N coarse-grain layer units. N is an integer greater than 1. An $i^{th}$ down-sampling module is connected to an $i^{th}$ channel layer unit and an $i^{th}$ coarse-grain layer unit respectively. The fine-grain layer unit is connected to an $N^{th}$ channel layer unit. The $i^{th}$ down-sampling module corresponds to an $i^{th}$ up-sampling module.

According to embodiments of the present disclosure, the prediction result may indicate a prediction coordinate information of a position. The real result may indicate a real coordinate information of a position. Different layer levels indicate different scales, and the prediction result and the real result corresponding to each layer level may be determined. The predetermined model may be trained using the respective prediction results and real results of the plurality of layer levels, so as to obtain the text rectification model.

According to embodiments of the present disclosure, through the use of multi-layer-level text image information, an extraction quality of the text structural feature may be improved, so that the rectification effect may be improved.

According to embodiments of the present disclosure, operation S430 may include the following operations.

An output value is obtained based on a regression loss function by using the respective prediction results and real results of the plurality of layer levels. A model parameter of the predetermined model is adjusted according to the output value until a predetermined condition is met. The predetermined model obtained when the predetermined condition is met is determined as the text image rectification model.

According to embodiments of the present disclosure, the predetermined condition may include at least one selected from that the output value converges or a number of training rounds reaches a maximum number of training rounds.

According to embodiments of the present disclosure, the regression loss function may be determined according to Equation (1).

$$L_{reg} = \sum_{i}^{N} \lambda_i \left[ \frac{1}{n_i} \sum_{j}^{n_i} |g_{ij} - \hat{g}_{ij}| - \lambda \frac{1}{n_i} \left| \sum_{j}^{n_i} (g_{ij} - \hat{g}_{ij}) \right| \right] \quad (1)$$

According to embodiments of the present disclosure, $L_{reg}$ represents a regression loss function. N represents a number of layer levels. $n_i$ represents a number of abnormal pixels in the down-sampling feature map of an $i^{th}$ layer level. $\lambda_i$ and $\lambda$ are hyper-parameters. For example, $\lambda_i=0.25$, $\lambda=0.1$. $g_{ij}$ represents a real result corresponding to a position j of the $i^{th}$ layer level. $\hat{g}_{ij}$ represents a prediction result corresponding to the position j of the $i^{th}$ layer level.

According to embodiments of the present disclosure, the rectification quality may be improved by using a multi-level encoder-decoder regression framework and a loss function to generate a text image rectification model with a high quality.

The above are merely exemplary embodiments, but the present disclosure is not limited thereto. The present disclosure may further include other methods of rectifying a text image and methods of training a text image rectification model known in the art, as long as the rectification quality of the text image to be rectified may be improved.

FIG. 5 schematically shows a block diagram of an apparatus of rectifying a text image according to embodiments of the present disclosure.

As shown in FIG. 5, an apparatus 500 of rectifying a text image may include a first obtaining module 510 and a second obtaining module 520.

The first obtaining module 510 may be used to perform, based on a gating strategy, a plurality of first layer-wise processing on a text image to be rectified, so as to obtain respective feature maps of a plurality of layer levels. Each of the feature maps includes a text structural feature related to the text image to be rectified, and the gating strategy is used to increase an attention to the text structural feature.

The second obtaining module 520 may be used to perform a plurality of second layer-wise processing on the respective feature maps of the plurality of layer levels, so as to obtain a rectified text image corresponding to the text image to be rectified.

According to embodiments of the present disclosure, the first obtaining module 510 may include a first obtaining sub-module.

The first obtaining sub-module may be used to perform, based on a text image rectification model, a plurality of first layer-wise processing on the text image to be rectified, so as to obtain the respective feature maps of the plurality of layer levels. The text image rectification model includes a gating module created according to the gating strategy.

According to embodiments of the present disclosure, the text image rectification model further includes an encoder, the gating module includes a plurality of channel layer units, and each of the channel layer units is used to determine a channel weight of each channel in the feature map corresponding to the channel layer unit.

According to embodiments of the present disclosure, the first obtaining sub-module may include a first obtaining unit.

The first obtaining unit may be used to perform, based on the encoder and the plurality of channel layer units, a plurality of first layer-wise processing on the text image to be rectified, so as to obtain the respective feature maps of the plurality of layer levels.

According to embodiments of the present disclosure, the text image rectification model further includes a decoder;

According to embodiments of the present disclosure, the second obtaining module 520 may further include a second obtaining sub-module.

The second obtaining sub-module may be used to perform, based on the decoder, a plurality of second layer-wise processing on the respective feature maps of the plurality of layer levels, so as to obtain the rectified text image corresponding to the text image to be rectified.

According to embodiments of the present disclosure, the encoder includes N down-sampling modules connected in cascade, the decoder includes N up-sampling modules connected in cascade, and the gating module includes N channel layer units, where N is an integer greater than 1.

According to embodiments of the present disclosure, the first obtaining unit may include a first obtaining sub-unit and a second obtaining sub-unit.

The first obtaining sub-unit may be used to, for $1 < i \leq N$, process a first down-sampling feature map of an $(i-1)^{th}$ layer level by using an $(i-1)^{th}$ channel layer unit, so as to obtain a channel weight feature map of the $(i-1)^{th}$ layer level.

The second obtaining sub-unit may be used to process the channel weight feature map of the $(i-1)^{th}$ layer level by using an $i^{th}$ down-sampling module, so as to obtain a first down-sampling feature map of the $i^{th}$ layer level.

According to embodiments of the present disclosure, the second obtaining sub-module may include a second obtaining unit, a third obtaining unit, a fourth obtaining unit, and a first determination unit.

The second obtaining unit may be used to, for $1 \leq i < N$, process a first output feature map of an $(i+1)^{th}$ layer level by using an $i^{th}$ up-sampling module, so as to obtain a first up-sampling feature map of an $i^{th}$ layer level.

The third obtaining unit may be used to fuse the first down-sampling feature map and the first up-sampling feature map of the $i^{th}$ layer level to obtain a first fusion feature map of the $i^{th}$ layer level.

The fourth obtaining unit may be used to process the first fusion feature map of the $i^{th}$ layer level by using an $i^{th}$ up-sampling module, so as to obtain a first output feature map of the $i^{th}$ layer level.

The first determination unit may be used to determine, according to the first output feature map of a first layer level, the rectified text image corresponding to the text image to be rectified.

According to embodiments of the present disclosure, the gating module further includes a fine-grain layer unit.

According to embodiments of the present disclosure, the apparatus 500 of rectifying the text image may further include a third obtaining module.

The third obtaining module may be used to process a channel weight feature map of an $N^{th}$ layer level by using the fine-grain layer unit, so as to obtain a first fine-grain feature map of the $N^{th}$ layer level.

According to embodiments of the present disclosure, the second obtaining sub-module may include a fifth obtaining unit, a sixth obtaining unit, and a seventh obtaining unit.

The fifth obtaining unit may be used to, for i=N, process the first fine-grain feature map of the $N^{th}$ layer level by using an $N^{th}$ up-sampling module, so as to obtain a first up-sampling feature map of the $N^{th}$ layer level.

The sixth obtaining unit may be used to fuse the first up-sampling feature map and the first down-sampling feature map of the $N^{th}$ layer level to obtain a first fusion feature map of the $N^{th}$ layer level.

The seventh obtaining unit may be used to process the first fusion feature map of the $N^{th}$ layer level by using the $N^{th}$ up-sampling module, so as to obtain a first output feature map of the $N^{th}$ layer level.

According to embodiments of the present disclosure, the gating module further includes N coarse-grain layer units.

According to embodiments of the present disclosure, the apparatus 500 of rectifying the text image may further include a fourth obtaining module.

The fourth obtaining module may be used to process a first down-sampling feature map of an $i^{th}$ layer level by using an $i^{th}$ coarse-grain layer unit, so as to obtain a first coarse-grain feature map of the $i^{th}$ layer level.

According to embodiments of the present disclosure, the third obtaining unit may include a third obtaining sub-unit.

The third obtaining sub-unit may be used to fuse the first coarse-grain feature map of the $i^{th}$ layer level and the first up-sampling feature map of the $i^{th}$ layer level to obtain the first fusion feature map of the $i^{th}$ layer level.

According to embodiments of the present disclosure, the text image rectification model further includes an encoder and a decoder, and the gating module includes a fine-grain layer unit.

According to embodiments of the present disclosure, the first obtaining sub-module may include an eighth obtaining unit.

The eighth obtaining unit may be used to perform, based on the encoder and the fine-grain layer unit, a plurality of first layer-wise processing on the text image to be rectified, so as to obtain the respective feature maps of the plurality of layer levels.

According to embodiments of the present disclosure, the second obtaining module 520 may include a third obtaining sub-module.

The third obtaining sub-module may be used to perform a plurality of second layer-wise processing on the respective feature maps of the plurality of layer levels based on the decoder, so as to obtain the rectified text image corresponding to the text image to be rectified.

According to embodiments of the present disclosure, the encoder includes N down-sampling modules connected in cascade, and the decoder includes N up-sampling modules connected in cascade, where N is an integer greater than 1.

According to embodiments of the present disclosure, the eighth obtaining unit may include a fourth obtaining sub-unit and a fifth obtaining sub-unit.

The fourth obtaining sub-unit may be used to, for $1<i\leq N$, process a second down-sampling feature map of an $(i-1)^{th}$ layer level by using an $i^{th}$ down-sampling module, so as to obtain a second down-sampling feature map of an $i^{th}$ layer level.

The fifth obtaining sub-unit may be used to process the second down-sampling feature map of an $N^{th}$ layer level by using the fine-grain layer unit, so as to obtain a second fine-grain feature map of the $N^{th}$ layer level.

According to embodiments of the present disclosure, the third obtaining sub-module may include a ninth obtaining unit, a tenth obtaining unit, an eleventh obtaining unit, a twelfth obtaining unit, and thirteenth obtaining unit, a fourteenth obtaining unit, a fifteenth obtaining unit, and a second determination unit.

The tenth obtaining unit may be used to, for i=N, process a fine-grain feature map of the $N^{th}$ layer level by using an $N^{th}$ up-sampling module, so as to obtain a second up-sampling feature map of the $N^{th}$ layer level.

The eleventh obtaining unit may be used to fuse the second up-sampling feature map and the second down-sampling feature map of the $N^{th}$ layer level to obtain a second fusion feature map of the $N^{th}$ layer level.

The twelfth obtaining unit may be used to process the second fusion feature map of the $N^{th}$ layer level by using an $N^{th}$ up-sampling module, so as to obtain a second output feature map of the $N^{th}$ layer level.

The thirteenth obtaining unit may be used to, for $1\leq i<N$, process a second output feature map of an $(i+1)^{th}$ layer level by using an $i^{th}$ up-sampling module, so as to obtain a second up-sampling feature map of the $i^{th}$ layer level.

The fourteenth obtaining unit may be used to fuse the second down-sampling feature map and the second up-sampling feature map of the $i^{th}$ layer level to obtain a second fusion feature map of the $i^{th}$ layer level.

The fifteenth obtaining unit may be used to process the second fusion feature map of the $i^{th}$ layer level by using an $i^{th}$ up-sampling module, so as to obtain a second output feature map of the $i^{th}$ layer level.

The second determination unit may be used to determine, according to the second output feature map of a first layer level, the rectified text image corresponding to the text image to be rectified.

According to embodiments of the present disclosure, the text image rectification model further includes an encoder and a decoder, and the gating module includes a plurality of coarse-grain layer units.

According to embodiments of the present disclosure, the first obtaining sub-module may include a sixteenth obtaining unit.

The sixteenth obtaining unit may be used to perform, based on the encoder and the plurality of coarse-grain layer units, a plurality of first layer-wise processing on the text image to be rectified, so as to obtain the respective feature maps of the plurality of layer levels.

According to embodiments of the present disclosure, the second obtaining module 520 may include a fourth obtaining sub-module.

The fourth obtaining sub-module may be used to perform a plurality of second layer-wise processing on the respective feature maps of the plurality of layer levels based on the decoder, so as to obtain the rectified text image corresponding to the text image to be rectified.

According to embodiments of the present disclosure, the encoder includes N down-sampling modules connected in cascade, the decoder includes N up-sampling modules connected in cascade, and the gating module includes N coarse-grain layer units, where N is an integer greater than 1.

According to embodiments of the present disclosure, the sixteenth obtaining unit may include a sixth obtaining sub-unit and a seventh obtaining sub-unit.

The sixth obtaining sub-unit may be used to, for $1<i\leq N$, process a second down-sampling feature map of an $(i-1)^{th}$ layer level by using an $i^{th}$ down-sampling module, so as to obtain a second down-sampling feature map of the $i^{th}$ layer level.

The seventh obtaining sub-unit may be used to process the second down-sampling feature map of the $i^{th}$ layer level by using an $i^{th}$ coarse-grain layer unit, so as to obtain a second coarse-grain feature map of the $i^{th}$ layer level.

According to embodiments of the present disclosure, the fourth obtaining sub-module may include a seventeenth obtaining unit, an eighteenth obtaining unit.

The seventeenth obtaining unit may be used to, for $1 \leq i < N$, process a third output feature map of an $(i+1)^{th}$ layer level by using an $i^{th}$ up-sampling module, so as to obtain a third output feature map of the $i^{th}$ layer level.

The eighteenth obtaining unit may be used to fuse the second coarse-grain feature map and the third output feature map of the $i^{th}$ layer level to obtain a third fusion feature map of the $i^{th}$ layer level.

The nineteenth obtaining unit may be used to process the third fusion feature map of the $i^{th}$ layer level by using the $i^{th}$ up-sampling module, so as to obtain a third output feature map of the $i^{th}$ layer level.

The twentieth obtaining unit may be used to determine, according to the third output feature map of a first layer level, the rectified text image corresponding to the text image to be rectified.

According to embodiments of the present disclosure, the $(i-1)^{th}$ channel layer unit includes M first processing layer combinations connected in cascade, each first processing layer combination includes a first processing layer and a second processing layer connected in cascade, each first processing layer includes Q pooling layers connected in parallel, and each second processing layer includes U first convolution layers connected in cascade, where M, Q and U are integers greater than or equal to 1.

According to embodiments of the present disclosure, the first obtaining sub-unit may be used to: process a first down-sampling feature map of the $(i-1)^{th}$ layer level by using the M first processing layer combinations connected in cascade of the $(i-1)^{th}$ channel layer unit, so as to obtain first intermediate feature maps respectively corresponding to the Q first processing layers connected in parallel of the $(i-1)^{th}$ layer level; obtain a first gating map of the $(i-1)^{th}$ layer level according to the Q first intermediate feature maps of the $(i-1)^{th}$ layer level; perform a dot multiplication on the first down-sampling feature map of the $(i-1)^{th}$ layer level and the first gating map of the $(i-1)^{th}$ layer level to obtain a second intermediate feature map of the $(i-1)^{th}$ layer level; and obtain the channel weight feature map of the $(i-1)^{th}$ layer level according to the first down-sampling feature map and the second intermediate feature map of the $(i-1)^{th}$ layer level.

According to embodiments of the present disclosure, the fine-grain layer unit includes P second processing layer combinations connected in parallel, each second processing layer combination includes V third processing layers connected in parallel, and each third processing layer includes S second convolution layers connected in cascade, where P, V and S are integers greater than or equal to 1.

According to embodiments of the present disclosure, the third obtaining module may include a fifth obtaining sub-module, a sixth obtaining sub-module, a seventh obtaining sub-module, and an eighth obtaining sub-module.

The fifth obtaining sub-module may be used to process the channel weight feature map of the $N^{th}$ layer level by using the P second processing layer combinations connected in parallel, respectively, so as to obtain third intermediate feature maps respectively corresponding to the P second processing layer combinations connected in parallel.

The sixth obtaining sub-module may be used to obtain a second gating map of the $N^{th}$ layer level according to the third intermediate feature maps respectively corresponding to the P second processing layer combinations connected in parallel.

The seventh obtaining sub-module may be used to obtain a fourth intermediate feature map of the $N^{th}$ layer level according to the channel weight feature map and the second gating map of the $N^{th}$ layer level.

The eighth obtaining sub-module may be used to obtain a fine-grain feature map of the $N^{th}$ layer level according to the channel weight feature map and the fourth intermediate feature map of the $N^{th}$ layer level.

According to embodiments of the present disclosure, the $i^{th}$ coarse-grain layer unit includes T dilated convolution layers connected in cascade, and different dilated convolution layers have different convolution dilation rates, where T is an integer greater than or equal to 1.

According to embodiments of the present disclosure, the fourth obtaining module may include a ninth obtaining sub-module and a tenth obtaining sub-module.

The ninth obtaining sub-module may be used to process the first down-sampling feature map of the $i^{th}$ layer level by using the T dilated convolution layers connected in cascade of the $i^{th}$ layer level, so as to obtain a third gating map of the $i^{th}$ layer level.

The tenth obtaining sub-module may be used to perform a dot multiplication on the first down-sampling feature map and the third gating map of the $i^{th}$ layer level to obtain the first coarse-grain feature map of the $i^{th}$ layer level.

According to embodiments of the present disclosure, the apparatus 500 of rectifying the text image may further include a fifth obtaining module.

The fifth obtaining module may be used to perform a text recognition on the rectified text image, so as to obtain a text recognition result.

Figure 6:
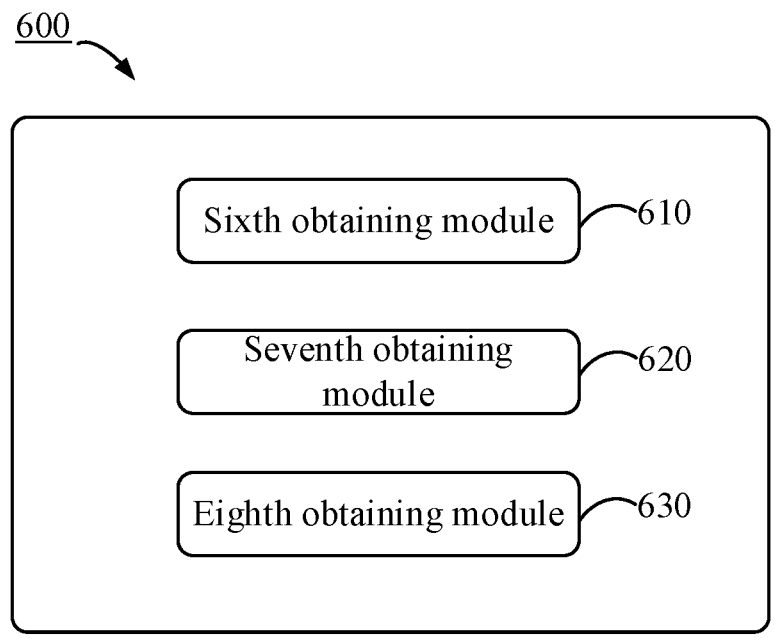
FIG. 6 schematically shows a block diagram of an apparatus of training a text image rectification model according to embodiments of the present disclosure.

FIG. 6 schematically shows a block diagram of an apparatus of training a text image rectification model according to embodiments of the present disclosure.

As shown in FIG. 6, an apparatus 600 of training a text image rectification model may include a sixth obtaining module 610, a seventh obtaining module 620, and an eighth obtaining module 630.

The sixth obtaining module may be used to perform, based on a gating strategy, a plurality of first layer-wise processing on a sample text image to be rectified, so as to obtain respective sample feature maps of a plurality of layer levels. Each sample feature map includes a text structural feature related to the sample text image to be rectified, and the gating strategy is used to increase an attention to the text structural feature.

The seventh obtaining module may be used to perform a plurality of second layer-wise processing on the respective sample feature maps of the plurality of layer levels, so as to obtain respective prediction results of the plurality of layer levels.

The eighth obtaining module may be used to train a predetermined model by using the respective prediction results and real results of the plurality of layer levels, so as to obtain the text image rectification model.

According to embodiments of the present disclosure, the eighth obtaining module may include an eleventh obtaining sub-module, an adjustment sub-module, and a determination sub-module.

The eleventh obtaining sub-module may be used to obtain an output value based on a regression loss function by using the respective prediction results and real results of the plurality of layer levels.

The adjustment sub-module may be used to adjust a model parameter of the predetermined model according to the output value until a predetermined condition is met.

The determination sub-module may be used to determine the predetermined model obtained in response to the predetermined condition being met as the text image rectification model.

According to embodiments of the present disclosure, the present disclosure further provides an electronic device, a readable storage medium, and a computer program product.

According to embodiments of the present disclosure, an electronic device is provided, including: at least one processor; and a memory communicatively connected to the at least one processor. The memory stores instructions executable by the at least one processor, and the instructions, when executed by the at least one processor, cause the at least one processor to implement the methods described above.

According to embodiments of the present disclosure, a non-transitory computer-readable storage medium having computer instructions therein is provided, and the computer instructions are configured to cause a computer to implement the methods described above.

According to embodiments of the present disclosure, a computer program product containing a computer program is provided, and the computer program, when executed by a processor, causes the processor to implement the methods described above.

Figure 7:
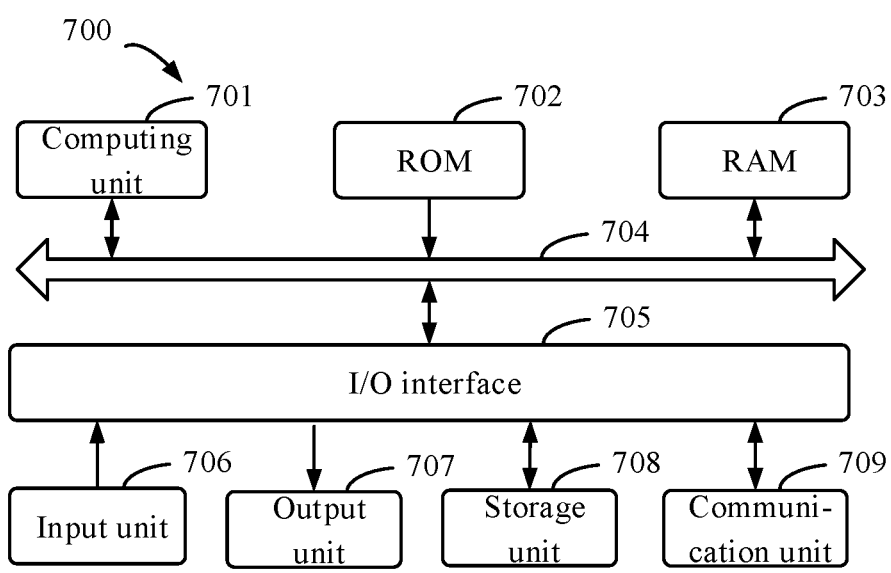
FIG. 7 schematically shows a block diagram of an electronic device suitable for implementing a method of rectifying a text image and a method of training a text image rectification model according to embodiments of the present disclosure.

FIG. 7 schematically shows a block diagram of an electronic device suitable for implementing the method of rectifying the text image and the method of training the text image rectification model according to embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 7, the electronic device 700 includes a computing unit 701 which may perform various appropriate actions and processes according to a computer program stored in a read only memory (ROM) 702 or a computer program loaded from a storage unit 708 into a random access memory (RAM) 703. In the RAM 703, various programs and data necessary for an operation of the electronic device 700 may also be stored. The computing unit 701, the ROM 702 and the RAM 703 are connected to each other through a bus 704. An input/output (I/O) interface 705 is also connected to the bus 704.

A plurality of components in the electronic device 700 are connected to the I/O interface 705, including: an input unit 706, such as a keyboard, or a mouse; an output unit 707, such as displays or speakers of various types; a storage unit 708, such as a disk, or an optical disc; and a communication unit 709, such as a network card, a modem, or a wireless communication transceiver. The communication unit 709 allows the electronic device 700 to exchange information/data with other devices through a computer network such as Internet and/or various telecommunication networks.

The computing unit 701 may be various general-purpose and/or dedicated processing assemblies having processing and computing capabilities. Some examples of the computing units 701 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 701 executes various methods and steps described above, such as the method of rectifying the text image or the method of training the text image rectification model. For example, in some embodiments, the method of rectifying the text image or the method of training the text image rectification model may be implemented as a computer software program which is tangibly embodied in a machine-readable medium, such as the storage unit 708. In some embodiments, the computer program may be partially or entirely loaded and/or installed in the electronic device 700 via the ROM 702 and/or the communication unit 709. The computer program, when loaded in the RAM 703 and executed by the computing unit 701, may execute one or more steps in the method of rectifying the text image or the method of training the text image rectification model described above. Alternatively, in other embodiments, the computing unit 701 may be configured to perform the method of rectifying the text image or the method of training the text image rectification model by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

A computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made with in the spirit and principles of the present disclosure shall be contained in the scope of protection of the present disclosure.

What is claimed is:

1. A method of rectifying a text image, the method comprising:
performing, based on a gating strategy, a plurality of first layer-wise processing on a text image to be rectified, so as to obtain respective feature maps of a plurality of layer levels, wherein each of the feature maps comprises a text structural feature related to the text image to be rectified, and the gating strategy is configured to increase an attention to the text structural feature; and
performing a plurality of second layer-wise processing on the respective feature maps of the plurality of layer levels, so as to obtain a rectified text image corresponding to the text image to be rectified,
wherein the performing, based on a gating strategy, a plurality of first layer-wise processing comprises performing, based on a text image rectification model, a plurality of first layer-wise processing on the text image to be rectified, so as to obtain the respective feature maps of the plurality of layer levels, wherein the text image rectification model comprises a gating module created according to the gating strategy,
wherein the text image rectification model further comprises an encoder and a decoder, the gating module comprises a plurality of channel layer units, and each of the channel layer units is configured to determine a channel weight of each channel in the feature map corresponding to the channel layer unit,
wherein the performing, based on a text image rectification model, a plurality of first layer-wise processing comprises performing, based on the encoder and the plurality of channel layer units, a plurality of first layer-wise processing on the text image to be rectified, so as to obtain the respective feature maps of the plurality of layer levels,
wherein the performing a plurality of second layer-wise processing comprises performing, based on the decoder, a plurality of second layer-wise processing on the respective feature maps of the plurality of layer levels, so as to obtain the rectified text image corresponding to the text image to be rectified,
wherein the encoder comprises N down-sampling modules connected in cascade, the decoder comprises N up-sampling modules connected in cascade, and the gating module comprises N channel layer units, where N is an integer greater than 1;
wherein the performing, based on the encoder and the plurality of channel layer units, a plurality of first layer-wise processing comprises:
for $1<i \leq N$, processing a first down-sampling feature map of an $(i-1)^{th}$ layer level by using an $(i-1)^{th}$ channel layer unit, so as to obtain a channel weight feature map of the $(i-1)^{th}$ layer level; and
processing the channel weight feature map of the $(i-1)^{th}$ layer level by using an $i^{th}$ down-sampling module, so as to obtain a first down-sampling feature map of the $i^{th}$ layer level; and
wherein the performing, based on the decoder, a plurality of second layer-wise processing comprises:
for $1 \leq i < N$, processing a first output feature map of an $(i+1)^{th}$ layer level by using an $i^{th}$ up-sampling module, so as to obtain a first up-sampling feature map of an $i^{th}$ layer level;
fusing the first down-sampling feature map and the first up-sampling feature map of the $i^{th}$ layer level to obtain a first fusion feature map of the $i^{th}$ layer level;
processing the first fusion feature map of the $i^{th}$ layer level by using the $i^{th}$ up-sampling module, so as to obtain a first output feature map of the $i^{th}$ layer level; and
determining, according to the first output feature map of a first layer level, the rectified text image corresponding to the text image to be rectified.

2. The method according to claim 1, wherein the gating module further comprises a fine-grain layer unit;

further comprising processing a channel weight feature map of an $N^{th}$ layer level by using the fine-grain layer unit, so as to obtain a first fine-grain feature map of the $N^{th}$ layer level; and wherein the performing, based on the decoder, a plurality of second layer-wise processing on the respective feature maps of the plurality of layer levels, so as to obtain the rectified text image corresponding to the text image to be rectified comprises:

for i=N, processing the first fine-grain feature map of the $N^{th}$ layer level by using an $N^{th}$ up-sampling module, so as to obtain a first up-sampling feature map of the $N^{th}$ layer level;

fusing the first up-sampling feature map and the first down-sampling feature map of the $N^{th}$ layer level to obtain a first fusion feature map of the $N^{th}$ layer level; and processing the first fusion feature map of the $N^{th}$ layer level by using the $N^{th}$ up-sampling module, so as to obtain a first output feature map of the $N^{th}$ layer level.

3. The method according to claim 1, wherein the gating module further comprises N coarse-grain layer units;

further comprising processing a first down-sampling feature map of an $i^{th}$ layer level by using an $i^{th}$ coarse-grain layer unit, so as to obtain a first coarse-grain feature map of the $i^{th}$ layer level; and wherein the fusing the first down-sampling feature map of the $i^{th}$ layer level and the first up-sampling feature map of the $i^{th}$ layer level to obtain a first fusion feature map of the $i^{th}$ layer level comprises fusing the first coarse-grain feature map of the $i^{th}$ layer level and the first up-sampling feature map of the $i^{th}$ layer level to obtain the first fusion feature map of the $i^{th}$ layer level.

4. The method according to claim 1, wherein the $(i-1)^{th}$ channel layer unit comprises M first processing layer combinations connected in cascade, each first processing layer combination comprises a first processing layer and a second processing layer connected in cascade, each first processing layer comprises Q pooling layers connected in parallel, and each second processing layer comprises U first convolution layers connected in cascade, where M, Q and U are integers greater than or equal to 1; and wherein the processing a first down-sampling feature map of the $(i-1)^{th}$ layer level by using an $(i-1)^{th}$ channel layer unit, so as to obtain a channel weight feature map of the $(i-1)^{th}$ layer level comprises:

processing a first down-sampling feature map of the $(i-1)^{th}$ layer level by using the M first processing layer combinations connected in cascade of the $(i-1)^{th}$ channel layer unit, so as to obtain first intermediate feature maps respectively corresponding to the Q first processing layers connected in parallel of the $(i-1)^{th}$ layer level;

obtaining a first gating map of the $(i-1)^{th}$ layer level according to the Q first intermediate feature maps of the $(i-1)^{th}$ layer level;

performing a dot multiplication on the first down-sampling feature map of the $(i-1)^{th}$ layer level and the first gating map of the $(i-1)^{th}$ layer level to obtain a second intermediate feature map of the $(i-1)^{th}$ layer level; and obtaining the channel weight feature map of the $(i-1)^{th}$ layer level according to the first down-sampling feature map and the second intermediate feature map of the $(i-1)^{th}$ layer level.

5. The method according to claim 1, wherein the fine-grain layer unit comprises P second processing layer combinations connected in parallel, each second processing layer combination comprises V third processing layers connected in parallel, and each third processing layer comprises S second convolution layers connected in cascade, where P, V and S are integers greater than or equal to 1; and wherein the processing a channel weight feature map of an $N^{th}$ layer level by using the fine-grain layer unit, so as to obtain a first fine-grain feature map of the $N^{th}$ layer level comprises:

processing the channel weight feature map of the $N^{th}$ layer level by using the P second processing layer combinations connected in parallel, respectively, so as to obtain third intermediate feature maps respectively corresponding to the P second processing layer combinations connected in parallel;

obtaining a second gating map of the $N^{th}$ layer level according to the third intermediate feature maps respectively corresponding to the P second processing layer combinations connected in parallel;

obtaining a fourth intermediate feature map of the $N^{th}$ layer level according to the channel weight feature map and the second gating map of the $N^{th}$ layer level; and obtaining a fine-grain feature map of the $N^{th}$ layer level according to the channel weight feature map and the fourth intermediate feature map of the $N^{th}$ layer level.

6. The method according to claim 3, wherein the $i^{th}$ coarse-grain layer unit comprises T dilated convolution layers connected in cascade, and different dilated convolution layers have different convolution dilation rates, where T is an integer greater than or equal to 1;

wherein the processing the first down-sampling feature map of the $i^{th}$ layer level by using an $i^{th}$ coarse-grain layer unit, so as to obtain a first coarse-grain feature map of the $i^{th}$ layer level comprises:

processing the first down-sampling feature map of the $i^{th}$ layer level by using the T dilated convolution layers connected in cascade of the $i^{th}$ layer level, so as to obtain a third gating map of the $i^{th}$ layer level; and performing a dot multiplication on the first down-sampling feature map and the third gating map of the $i^{th}$ layer level to obtain the first coarse-grain feature map of the $i^{th}$ layer level; and further comprising performing a text recognition on the rectified text image, so as to obtain a text recognition result.

7. A method of training a text image rectification model, the method comprising:

performing, based on a gating strategy, a plurality of first layer-wise processing on a sample text image to be rectified, so as to obtain respective sample feature maps of a plurality of layer levels, wherein each sample feature map comprises a text structural feature related to the sample text image to be rectified, and the gating strategy is configured to increase an attention to the text structural feature;

performing a plurality of second layer-wise processing on the respective sample feature maps of the plurality of layer levels, so as to obtain respective prediction results of the plurality of layer levels; and training a predetermined model by using the respective prediction results and real results of the plurality of layer levels, so as to obtain a trained text image rectification model, wherein the trained text image rectification model is configured to implement the method of claim 1, wherein the performing, based on a gating strategy, a plurality of first layer-wise processing on a sample text image to be rectified comprises performing, based on a text image rectification model, a plurality of first layer-wise processing on the sample text image to be rectified, so as to obtain the respective sample feature maps of the plurality of layer levels, wherein the text image rectification model comprises a gating module created according to the gating strategy;

wherein the text image rectification model further comprises an encoder and a decoder, the gating module comprises a plurality of channel layer units, and each of the channel layer units is configured to determine a channel weight of each channel in the sample feature map corresponding to the channel layer unit; and wherein the performing, based on a text image rectification model, a plurality of first layer-wise processing on the sample text image to be rectified comprises performing, based on the encoder and the plurality of channel layer units, a plurality of first layer-wise processing on the sample text image to be rectified, so as to obtain the respective sample feature maps of the plurality of layer levels;

wherein the performing a plurality of second layer-wise processing on the respective sample feature maps of the plurality of layer levels comprises performing, based on the decoder, a plurality of second layer-wise processing on the respective sample feature maps of the plurality of layer levels, so as to obtain the respective prediction results of the plurality of layer levels;

wherein the encoder comprises N down-sampling modules connected in cascade, the decoder comprises N up-sampling modules connected in cascade, and the gating module comprises N channel layer units, where N is an integer greater than 1;

wherein the performing, based on the encoder and the plurality of channel layer units, a plurality of first layer-wise processing on the sample text image to be rectified comprises:

for $1<i\leq N$, processing a first down-sampling feature map of an $(i-1)^{th}$ layer level by using an $(i-1)^{th}$ channel layer unit, so as to obtain a channel weight feature map of the $(i-1)^{th}$ layer level; and processing the channel weight feature map of the $(i-1)^{th}$ layer level by using an $i^{th}$ down-sampling module, so as to obtain a first down-sampling feature map of the $i^{th}$ layer level; and wherein the performing, based on the decoder, a plurality of second layer-wise processing on the respective sample feature maps of the plurality of layer levels comprises:

for $1\leq i<N$, processing a first output feature map of an $(i+1)^{th}$ layer level by using an $i^{th}$ up-sampling module, so as to obtain a first up-sampling feature map of an $i^{th}$ layer level;

fusing the first down-sampling feature map and the first up-sampling feature map of the $i^{th}$ layer level to obtain a first fusion feature map of the $i^{th}$ layer level;

processing the first fusion feature map of the $i^{th}$ layer level by using the $i^{th}$ up-sampling module, so as to obtain a first output feature map of the $i^{th}$ layer level; and determining, according to the first output feature map of a first layer level, the rectified sample text image corresponding to the sample text image to be rectified.

8. The method according to claim 7, wherein the training a predetermined model by using the respective prediction results and real results of the plurality of layer levels, so as to obtain the text image rectification model comprises:

obtaining an output value based on a regression loss function by using the respective prediction results and real results of the plurality of layer levels;

adjusting a model parameter of the predetermined model according to the output value until a predetermined condition is met; and determining the predetermined model obtained in response to the predetermined condition being met as the text image rectification model.

9. An electronic device, comprising:
at least one processor; and
a memory communicatively connected to the at least one processor, wherein the memory stores instructions executable by the at least one processor, the instructions, when executed by the at least one processor, configured to cause the at least one processor to implement at least the method of claim 1.

10. An electronic device, comprising:
at least one processor; and
a memory communicatively connected to the at least one processor, wherein the memory stores instructions executable by the at least one processor, the instructions, when executed by the at least one processor, configured to cause the at least one processor to implement at least the method of claim 7.

11. A non-transitory computer-readable storage medium having computer instructions therein, wherein the computer instructions are configured to cause a computer system to implement at least the method of claim 1.

12. A non-transitory computer-readable storage medium having computer instructions therein, wherein the computer instructions are configured to cause a computer system to implement at least the method of claim 7.

13. A method of rectifying a text image, the method comprising:

performing, based on a gating strategy, a plurality of first layer-wise processing on a text image to be rectified, so as to obtain respective feature maps of a plurality of layer levels, wherein each of the feature maps comprises a text structural feature related to the text image to be rectified, and the gating strategy is configured to increase an attention to the text structural feature; and performing a plurality of second layer-wise processing on the respective feature maps of the plurality of layer levels, so as to obtain a rectified text image corresponding to the text image to be rectified, wherein the performing, based on a gating strategy, a plurality of first layer-wise processing comprises performing, based on a text image rectification model, a plurality of first layer-wise processing on the text image to be rectified, so as to obtain the respective feature maps of the plurality of layer levels, wherein the text image rectification model comprises a gating module created according to the gating strategy, wherein the text image rectification model further comprises an encoder and a decoder, and the gating module comprises a fine-grain layer unit;

wherein the performing, based on a text image rectification model, a plurality of first layer-wise processing comprises performing, based on the encoder and the fine-grain layer unit, a plurality of first layer-wise processing on the text image to be rectified, so as to obtain the respective feature maps of the plurality of layer levels; and wherein the performing a plurality of second layer-wise processing on the respective feature maps comprises performing a plurality of second layer-wise processing on the respective feature maps of the plurality of layer levels based on the decoder, so as to obtain the rectified text image corresponding to the text image to be rectified, wherein the encoder comprises N down-sampling modules connected in cascade, and the decoder comprises N up-sampling modules connected in cascade, where N is an integer greater than 1;

wherein the performing, based on the encoder and the fine-grain layer unit, a plurality of first layer-wise processing comprises:

for $1<i\leq N$, processing a second down-sampling feature map of an $(i-1)^{th}$ layer level by using an $i^{th}$ down-sampling module, so as to obtain a second down-sampling feature map of an $i^{th}$ layer level; and processing the second down-sampling feature map of an $N^{th}$ layer level by using the fine-grain layer unit, so as to obtain a second fine-grain feature map of the $N^{th}$ layer level; and wherein the performing, based on the decoder, a plurality of second layer-wise processing comprises:

for $i=N$, processing a fine-grain feature map of the $N^{th}$ layer level by using an $N^{th}$ up-sampling module, so as to obtain a second up-sampling feature map of the $N^{th}$ layer level;

fusing the second up-sampling feature map and the second down-sampling feature map of the $N^{th}$ layer level to obtain a second fusion feature map of the $N^{th}$ layer level;

processing the second fusion feature map of the $N^{th}$ layer level by using the $N^{th}$ up-sampling module, so as to obtain a second output feature map of the $N^{th}$ layer level;

for $1\leq i<N$, processing a second output feature map of an $(i+1)^{th}$ layer level by using an $i^{th}$ up-sampling module, so as to obtain a second up-sampling feature map of the $i^{th}$ layer level;

fusing the second down-sampling feature map and the second up-sampling feature map of the $i^{th}$ layer level to obtain a second fusion feature map of the $i^{th}$ layer level;

processing the second fusion feature map of the $i^{th}$ layer level by using the $i^{th}$ up-sampling module, so as to obtain a second output feature map of the $i^{th}$ layer level; and determining, according to the second output feature map of a first layer level, the rectified text image corresponding to the text image to be rectified.

14. A method of training a text image rectification model, the method comprising:

performing, based on a gating strategy, a plurality of first layer-wise processing on a sample text image to be rectified, so as to obtain respective sample feature maps of a plurality of layer levels, wherein each sample feature map comprises a text structural feature related to the sample text image to be rectified, and the gating strategy is configured to increase an attention to the text structural feature;

performing a plurality of second layer-wise processing on the respective sample feature maps of the plurality of layer levels, so as to obtain respective prediction results of the plurality of layer levels; and training a predetermined model by using the respective prediction results and real results of the plurality of layer levels, so as to obtain a trained text image rectification model, wherein the trained text image rectification model is configured to implement the method of claim 13, wherein the performing, based on a gating strategy, a plurality of first layer-wise processing on a sample text image to be rectified comprises performing, based on a text image rectification model, a plurality of first layer-wise processing on the sample text image to be rectified, so as to obtain the respective sample feature maps of the plurality of layer levels, wherein the text image rectification model comprises a gating module created according to the gating strategy, wherein the text image rectification model further comprises an encoder and a decoder, and the gating module comprises a fine-grain layer unit;

wherein the performing, based on a text image rectification model, a plurality of first layer-wise processing on the sample text image to be rectified comprises performing, based on the encoder and the fine-grain layer unit, a plurality of first layer-wise processing on the sample text image to be rectified, so as to obtain the respective sample feature maps of the plurality of layer levels; and wherein the performing a plurality of second layer-wise processing on the respective sample feature maps of the plurality of layer levels comprises performing a plurality of second layer-wise processing on the respective sample feature maps of the plurality of layer levels based on the decoder, so as to obtain respective prediction results of the plurality of layer levels, wherein the encoder comprises N down-sampling modules connected in cascade, and the decoder comprises N up-sampling modules connected in cascade, where N is an integer greater than 1;

wherein the performing, based on the encoder and the fine-grain layer unit, a plurality of first layer-wise processing on the sample text image to be rectified comprises:

for $1<i\leq N$, processing a second down-sampling feature map of an $(i-1)^{th}$ layer level by using an $i^{th}$ down-sampling module, so as to obtain a second down-sampling feature map of an $i^{th}$ layer level; and processing the second down-sampling feature map of an $N^{th}$ layer level by using the fine-grain layer unit, so as to obtain a second fine-grain feature map of the $N^{th}$ layer level; and wherein the performing, based on the decoder, a plurality of second layer-wise processing on the respective sample feature maps of the plurality of layer levels comprises:

for $i=N$, processing a fine-grain feature map of the $N^{th}$ layer level by using an $N^{th}$ up-sampling module, so as to obtain a second up-sampling feature map of the $N^{th}$ layer level;

fusing the second up-sampling feature map and the second down-sampling feature map of the $N^{th}$ layer level to obtain a second fusion feature map of the $N^{th}$ layer level;

processing the second fusion feature map of the $N^{th}$ layer level by using the $N^{th}$ up-sampling module, so as to obtain a second output feature map of the $N^{th}$ layer level;

for $1 \leq i < N$, processing a second output feature map of an $(i+1)^{th}$ layer level by using an $i^{th}$ up-sampling module, so as to obtain a second up-sampling feature map of the $i^{th}$ layer level;

fusing the second down-sampling feature map and the second up-sampling feature map of the $i^{th}$ layer level to obtain a second fusion feature map of the $i^{th}$ layer level;

processing the second fusion feature map of the $i^{th}$ layer level by using the $i^{th}$ up-sampling module, so as to obtain a second output feature map of the $i^{th}$ layer level; and determining, according to the second output feature map of a first layer level, the rectified sample text image corresponding to the text image to be rectified.

15. An electronic device, comprising:
at least one processor; and
a memory communicatively connected to the at least one processor, wherein the memory stores instructions executable by the at least one processor, the instructions, when executed by the at least one processor, configured to cause the at least one processor to implement at least the method of claim 13.

16. An electronic device, comprising:
at least one processor; and
a memory communicatively connected to the at least one processor, wherein the memory stores instructions executable by the at least one processor, the instructions, when executed by the at least one processor, configured to cause the at least one processor to implement at least the method of claim 14.

17. A method of rectifying a text image, the method comprising:

performing, based on a gating strategy, a plurality of first layer-wise processing on a text image to be rectified, so as to obtain respective feature maps of a plurality of layer levels, wherein each of the feature maps comprises a text structural feature related to the text image to be rectified, and the gating strategy is configured to increase an attention to the text structural feature; and performing a plurality of second layer-wise processing on the respective feature maps of the plurality of layer levels, so as to obtain a rectified text image corresponding to the text image to be rectified, wherein the performing, based on a gating strategy, a plurality of first layer-wise processing comprises performing, based on a text image rectification model, a plurality of first layer-wise processing on the text image to be rectified, so as to obtain the respective feature maps of the plurality of layer levels, wherein the text image rectification model comprises a gating module created according to the gating strategy, wherein the text image rectification model further comprises an encoder and a decoder, and the gating module comprises a plurality of coarse-grain layer units;

wherein the performing, based on a text image rectification model, a plurality of first layer-wise processing comprises performing, based on the encoder and the plurality of coarse-grain layer units, a plurality of first layer-wise processing on the text image to be rectified, so as to obtain the respective feature maps of the plurality of layer levels; and wherein the performing a plurality of second layer-wise processing comprises performing a plurality of second layer-wise processing on the respective feature maps of the plurality of layer levels based on the decoder, so as to obtain the rectified text image corresponding to the text image to be rectified, wherein the encoder comprises N down-sampling modules connected in cascade, the decoder comprises N up-sampling modules connected in cascade, and the gating module comprises N coarse-grain layer units, where N is an integer greater than 1;

wherein the performing, based on the encoder and the plurality of coarse-grain layer units, a plurality of first layer-wise processing comprises:

for $1 < i \leq N$, processing a second down-sampling feature map of an $(i-1)^{th}$ layer level by using an $i^{th}$ down-sampling module, so as to obtain a second down-sampling feature map of the $i^{th}$ layer level; and processing the second down-sampling feature map of the $i^{th}$ layer level by using an $i^{th}$ coarse-grain layer unit, so as to obtain a second coarse-grain feature map of the $i^{th}$ layer level; and wherein the performing a plurality of second layer-wise processing on the respective feature maps of the plurality of layer levels based on the decoder comprises:

for $1 \leq i < N$, processing a third output feature map of an $(i+1)^{th}$ layer level by using an $i^{th}$ up-sampling module, so as to obtain a third up-sampling feature map of the $i^{th}$ layer level;

fusing the second coarse-grain feature map and the third up-sampling feature map of the $i^{th}$ layer level to obtain a third fusion feature map of the $i^{th}$ layer level;

processing the third fusion feature map of the $i^{th}$ layer level by using the $i^{th}$ up-sampling module, so as to obtain a third output feature map of the $i^{th}$ layer level; and determining, according to the third output feature map of a first layer level, the rectified text image corresponding to the text image to be rectified.

18. A method of training a text image rectification model, the method comprising:

performing, based on a gating strategy, a plurality of first layer-wise processing on a sample text image to be rectified, so as to obtain respective sample feature maps of a plurality of layer levels, wherein each sample feature map comprises a text structural feature related to the sample text image to be rectified, and the gating strategy is configured to increase an attention to the text structural feature;

performing a plurality of second layer-wise processing on the respective sample feature maps of the plurality of layer levels, so as to obtain respective prediction results of the plurality of layer levels; and training a predetermined model by using the respective prediction results and real results of the plurality of layer levels, so as to obtain a trained text image rectification model, wherein the trained text image rectification model is configured to implement the method of claim 17, wherein the performing, based on a gating strategy, a plurality of first layer-wise processing on a sample text image to be rectified comprises performing, based on a text image rectification model, a plurality of first layer-wise processing on the sample text image to be rectified, so as to obtain the respective sample feature maps of the plurality of layer levels, wherein the text image rectification model comprises a gating module created according to the gating strategy, wherein the text image rectification model further comprises an encoder and a decoder, and the gating module comprises a plurality of coarse-grain layer units;

wherein the performing, based on a text image rectification model, a plurality of first layer-wise processing on the sample text image to be rectified comprises performing, based on the encoder and the plurality of coarse-grain layer units, a plurality of first layer-wise processing on the sample text image to be rectified, so as to obtain the respective sample feature maps of the plurality of layer levels; and wherein the performing a plurality of second layer-wise processing on the respective sample feature maps of the plurality of layer levels comprises performing a plurality of second layer-wise processing on the respective sample feature maps of the plurality of layer levels based on the decoder, so as to obtain respective prediction results of the plurality of layer levels, wherein the encoder comprises N down-sampling modules connected in cascade, the decoder comprises N up-sampling modules connected in cascade, and the gating module comprises N coarse-grain layer units, where N is an integer greater than 1;

wherein the performing, based on the encoder and the plurality of coarse-grain layer units, a plurality of first layer-wise processing on the sample text image to be rectified comprises:

for $1 < i \leq N$, processing a second down-sampling feature map of an $(i-1)^{th}$ layer level by using an $i^{th}$ down-sampling module, so as to obtain a second down-sampling feature map of the $i^{th}$ layer level; and processing the second down-sampling feature map of the $i^{th}$ layer level by using an $i^{th}$ coarse-grain layer unit, so as to obtain a second coarse-grain feature map of the $i^{th}$ layer level; and wherein the performing a plurality of second layer-wise processing on the respective sample feature maps of the plurality of layer levels based on the decoder comprises:

for $1 \leq i < N$, processing a third output feature map of an $(i+1)^{th}$ layer level by using an $i^{th}$ up-sampling module, so as to obtain a third up-sampling feature map of the $i^{th}$ layer level;

fusing the second coarse-grain feature map and the third up-sampling feature map of the $i^{th}$ layer level to obtain a third fusion feature map of the $i^{th}$ layer level;

processing the third fusion feature map of the $i^{th}$ layer level by using the $i^{th}$ up-sampling module, so as to obtain a third output feature map of the $i^{th}$ layer level; and determining, according to the third output feature map of a first layer level, the rectified sample text image corresponding to the sample text image to be rectified.

19. An electronic device, comprising:

at least one processor; and a memory communicatively connected to the at least one processor, wherein the memory stores instructions executable by the at least one processor, the instructions, when executed by the at least one processor, configured to cause the at least one processor to implement at least the method of claim 17.

20. An electronic device, comprising:

at least one processor; and a memory communicatively connected to the at least one processor, wherein the memory stores instructions executable by the at least one processor, the instructions, when executed by the at least one processor, configured to cause the at least one processor to implement at least the method of claim 18.

* * * * *